United States Patent
Hong et al.

(10) Patent No.: US 8,175,369 B2
(45) Date of Patent: May 8, 2012

(54) MULTI-NUCLEATED CELL CLASSIFICATION AND MICRONUCLEI SCORING

(75) Inventors: Dihui Hong, Downington, PA (US); Avrum I. Cohen, Downington, PA (US)

(73) Assignee: Molecular Devices, LLC, Sunnyvale, CA (US)

( * ) Notice: Subject to any disclaimer, the term of this patent is extended or adjusted under 35 U.S.C. 154(b) by 690 days.

(21) Appl. No.: 12/316,497

(22) Filed: Dec. 12, 2008

(65) Prior Publication Data

US 2010/0150423 A1    Jun. 17, 2010

(51) Int. Cl.
*G06K 9/00*    (2006.01)
(52) U.S. Cl. ....................................... 382/133; 435/40.5
(58) Field of Classification Search .................. 382/133, 382/134; 435/40.5
See application file for complete search history.

(56) References Cited

U.S. PATENT DOCUMENTS

| | | | |
|---|---|---|---|
| 2004/0023320 A1* | 2/2004 | Steiner et al. | 435/40.5 |
| 2005/0002552 A1* | 1/2005 | Dunn et al. | 382/133 |
| 2011/0044527 A1* | 2/2011 | Tibbe et al. | 382/133 |

* cited by examiner

*Primary Examiner* — William C Dowling
(74) *Attorney, Agent, or Firm* — Bella Fishman

(57) ABSTRACT

Methods and systems for counting nuclei for cells in a cell-containing sample are disclosed, such as carried out on a computer. The methods comprise: receiving a raw image of the cell-containing sample; transforming the raw image into a segmented image comprising one or more nuclei clusters. The methods further comprise: for each of the one or more nuclei clusters, obtaining a convex hull of the nuclei cluster; locating any indentations on the nuclei cluster by comparing the nuclei cluster to the convex hull of the nuclei cluster; calculating a first nuclei count based on a tally of the indentations; and assigning the nuclei cluster to a cell among the plurality of cells. The methods further comprise: calculating a second nuclei count for each cell by totaling the first nuclei counts of its constituent nuclei clusters; and presenting a result based on the second nuclei count for at least one of the plurality of cells.

21 Claims, 17 Drawing Sheets

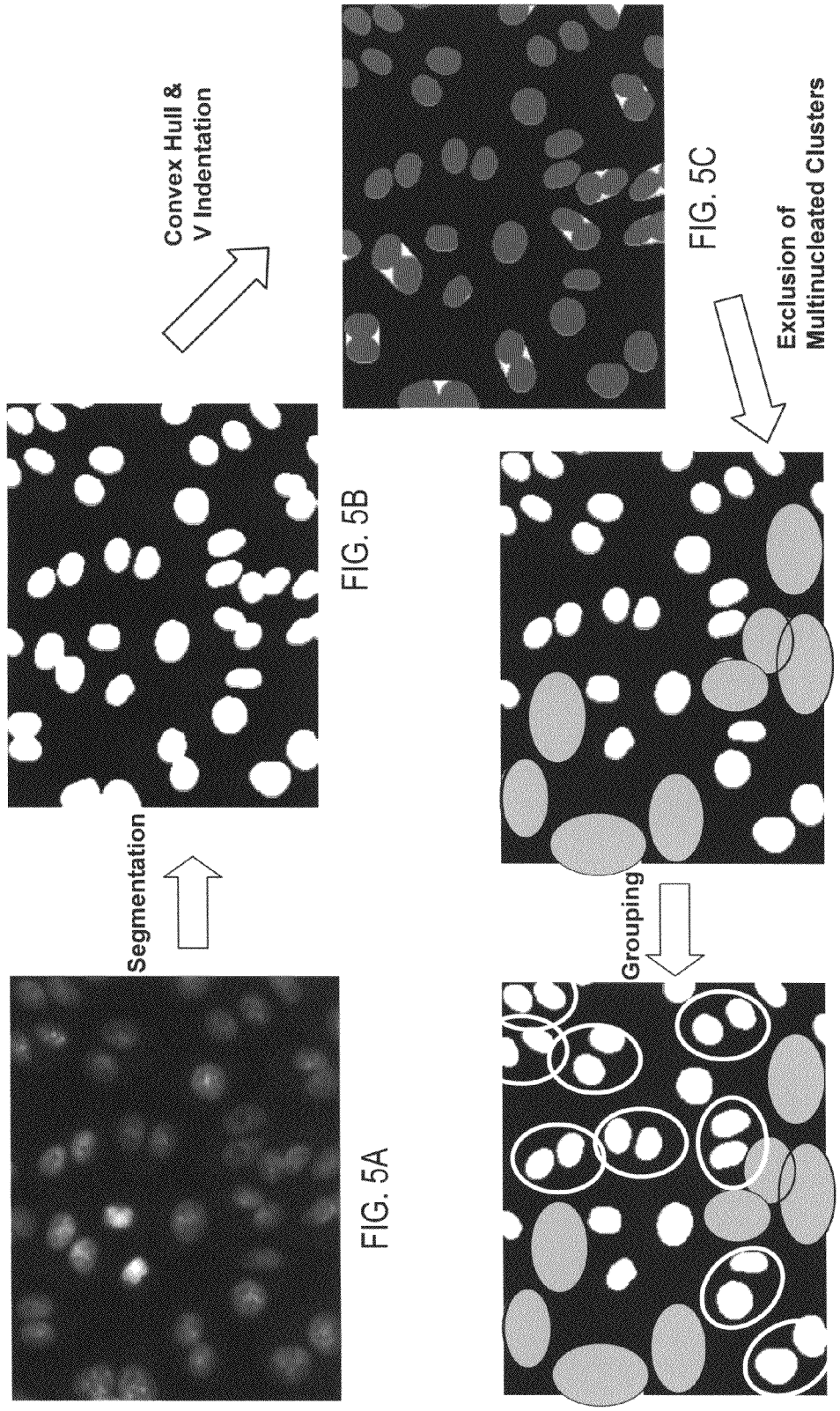

MULTI-NUCLEATED CELL CLASSIFICATION AND MICRONUCLEI SCORING

TECHNICAL FIELD

The technology described herein generally relates to computer-implemented image processing. The technology more particularly relates to systems and methods for multi-nucleated cell classification and micronuclei scoring.

BACKGROUND

Environmental toxins and drugs often have clastogenic effects on living cells, i.e., cause microscopically visible damage or changes to cell chromosomes and cell cycle delays. Damage to cell chromosomes include breaks and rearrangements in the chromosomes, and changes in chromosome number. The clastogenic effects of a toxin or drug can lead to formation of micronuclei and presence of multiple nuclei in the living cells that are exposed to the toxin or drug. Therefore, micronucleus formation, and the presence of multi-nucleated cells can be used as indicators of genetic toxicity for certain environmental toxins and for evaluation of drug candidates during the development cycle of a new drug.

Evaluation of clastogenic effects of drugs or environmental toxins is usually accomplished by some form of micronucleus assay. A micronucleus assay is among a set of genetic toxicology assays wherein cultured cells are treated to induce formation of micronuclei and are then analyzed and scored for the extent of micronucleus induction. During a micronucleus assay, broken or detached chromosomes are separated from the spindle apparatus, and after cells undergo mitosis, the fragments become trapped in the cell cytoplasm and form micronuclei. The frequency of micronuclei formation in the micronucleus assay can then be measured and used to determine genotoxicity. In addition, the ratio of multi-nucleated cells to mono-nucleated cells provides information of cell-cycle delay, which is an early indicator of cytotoxicity.

An example micronucleus assay is the cytokinesis-block micronucleus (CBMN) assay for measuring micronuclei induction in cultured human and/or mammalian cells. During the CBMN assay, the cell cultures are exposed to the test substances; after exposure to the test substance, cytochalasin B for blocking cytokinesis is added; then the cell cultures are grown for a period sufficient to allow chromosomal damage to lead to the formation of micronuclei in bi- or multinucleated interphase cells, and then the cells are harvested and stained to permit micronuclei detection and scoring.

A micronucleus assay can be carried out in a multi-well plate. During such an assay, various fluorophores or fluorescent stains are applied to the cultured cells in the wells on the plate. Different stains are usually applied to cell nuclei and cytoplasm of the cultured cells. The nuclei stain and the cytoplasm stain are selectively excited using a different combination of excitation and emission filters, and separate fluorescent images of the stained cell nuclei and cytoplasm are obtained. Identification and counting of cells, nuclei, and micronuclei, in the micronuclei assay can be conducted manually by a technician or by an image processing system or software module based on the fluorescent images. Accurate detection of cell boundaries and correct assignment of nuclei and micronuclei to their respective cells are critical in scoring micronucleus induction that has occurred in the assay.

FIGS. 1A-1C are examples of fluorescent images of a cell sample stained with a cytoplasmic marker and a nuclear marker. In a two-channel fluorescent imaging system, the cytoplasm marker and the nuclear marker attached to the cells are selectively excited by light of two different frequencies, and their fluorescent emissions are separately captured in a cytoplasm image (as shown in FIG. 1A) and a nuclear image (as shown in FIG. 1B). The complete cell image is obtained by overlaying the two images together (as shown in FIG. 1C). In this example, the cytoplasm image can be processed to show the boundaries of the cells (i.e., red lines shown in FIG. 1A), and for calculating the number of nuclei per cell.

Current techniques for micronucleus scoring require images of both the cytoplasm and the nuclei for detecting cell boundaries and assigning nuclei and micronuclei to their respective cells. In essence, nuclei and micronuclei are assigned to their respective cells based on a calculation of where the cell boundaries are, principally because the cells are significantly larger than the nuclei and so the precision requirements for cell boundary detection are easier to satisfy. Hence, in the absence of a single stain that improves the contrast of both cytoplasm and nuclear material, a separate stain must be used to facilitate imaging of cytoplasm from that which is used to highlight the location of the nuclei. Such techniques are time-consuming because the samples must be stained and imaged twice, often require several trained personnel, and can be subjective in their determination. In particular, the requirement for separate cytoplasm imaging introduces significant amounts of time and cost for sample preparation and image processing.

Furthermore, the accuracy of cell boundary detection is significantly affected by the confluency state of the cell sample. High confluency makes cell boundary splitting very difficult and decreases the accuracy of these techniques. FIG. 2 shows an exemplary fluorescent image of a cell sample in a high confluency state. As cells are spaced more closely, proper assignment of nuclei to cells requires a higher precision of cell boundary detection. At the same time, cell boundary detection based on the cytoplasm image becomes more difficult with such high confluency.

Accordingly, there is a need for a fast, accurate, objective, automated, and cost effective method and/or system for the identification and quantification of micronuclei formation, and presence of multi-nuclear cells.

SUMMARY

The present technology includes computer-implemented methods for counting nuclei of a plurality of cells in a cell-containing sample as described. A method includes: receiving a raw image of the cell-containing sample; transforming the raw image into a segmented image including one or more nuclei clusters on a contrasting background; for each of the one or more nuclei clusters, obtaining a convex hull of the nuclei cluster; locating any indentations on the nuclei cluster by comparing the nuclei cluster to the convex hull of the nuclei cluster; calculating a first nuclei count based on a tally of the indentations; and assigning the nuclei cluster to a cell among the plurality of cells; calculating a second nuclei count for each cell of the plurality of cells by totaling the first nuclei counts of its constituent nuclei clusters; and presenting to a user a result based on the second nuclei count for at least one of the plurality of cells.

The method can further include steps for splitting a nuclei cluster having one or more indentations into its constituent nuclei, including: enhancing a size of each of the one or more indentations; and splitting the nuclei cluster, at the indentations, into two or more nuclei.

The method can further include steps for counting micronuclei of cells in the cell-containing sample, including:

receiving one or more micronuclei parameters specifying an estimated size, a minimum intensity, and a distance range from a main nucleus for micronuclei in the raw image; transforming the raw image into a second image including one or more unattached micronuclei based on the one or more micronuclei parameters; transforming the raw image into a third segmented image including one or more nuclei clusters based on the one or more micronuclei parameters such that the third segmented image has sufficient resolution to include attached micronuclei in the one or more nuclei clusters; detecting any attached micronuclei in the one or more nuclei clusters in the third segmented image; assigning each of the unattached and attached micronuclei to a cell among the plurality of cells; and calculating a micronuclei count for each of the plurality of cells by tallying the unattached and the attached micronuclei that are assigned to the cell.

A method for counting cell nuclei in a cell-containing sample is disclosed. The method includes: applying a nuclear stain to the cell-containing sample; recording an image of the cell-containing sample, after applying the stain; obtaining a convex hull of one or more clusters of nuclei in the image; for each of the one or more clusters for which a convex hull is obtained: ascertaining a number of nuclei in the cluster; and assigning the cluster to a cell. The method further includes: presenting a number of nuclei present in a cell in the sample.

A method for counting cell nuclei in a cell-containing sample is disclosed. The method includes: applying a nuclear stain to the cell-containing sample; obtaining an image of the cell-containing sample using a single channel of a fluorescent imaging apparatus; and without applying a second stain that marks cell cytoplasm in the cell-containing sample, analyzing the image of the cell-containing sample to obtain a count of the number of cell nuclei in the image.

The methods can report the number of nuclei, micronuclei, and percentage of cells that contain micronuclei, frequency of micronuclei formation, and ratio of multinucleated to mononucleated cells.

A system implementing any of the methods described herein is also disclosed.

A computer-readable medium encoded with instructions for carrying out certain, or all, steps of any of the methods described herein is also disclosed.

BRIEF DESCRIPTION OF THE DRAWINGS

FIGS. 5A-5E show an exemplary process for identifying, grouping, and counting nuclei for cells in a cell-containing sample based on a nuclear image of the cell-containing sample.

DETAILED DESCRIPTION

Overview

The methods, systems, and computer-readable media implementing the methods disclosed herein decrease the time required to quantitatively analyze populations of cells for micronucleus induction, and/or presence of multi-nucleated cells. In certain embodiments, only an image of the cell nuclei is required. In such embodiments, cytoplasm staining, imaging, and processing of images of cytoplasm are not required for the assignment of nuclei and micronuclei to cells.

The methods described herein can be automated and can also help reduce subjectivity in image interpretation and nuclei counting. The methods are adaptable for simultaneously evaluating multiple exposed wells in a plate, such as where multiple samples are imaged concurrently. Whereas, for example, manual evaluation of the effects of a single compound on a population of cells may take 1-2 weeks using methods known currently to those skilled in the art, the methods described herein can produce results for an entire 96-well plate in a few hours. Thus, the methods describe herein provide significant improvements in throughput and cost per compound tested, enabling genotoxicity and cytotoxicity testing to be practical at an earlier stage of the drug discovery process, thereby saving time and money by eliminating unpromising drug candidates more rapidly.

The instant disclosure describes image processing methods for identifying and counting the numbers of cells, nuclei per cell, and micronuclei per cell, in an image of cells, such as a fluorescent image of stained cells. The methods are particularly suitable for applications in which a cell containing sample is stained with only a nuclear marker. In such an embodiment, a cytoplasmic marker is not required for the identification and counting of nuclei and micronuclei, which saves significant amount of time and cost associated with cytoplasmic staining and cytoplasmic image processing. Using the methods described in the present disclosure, assignment of nuclei and micronuclei to a cell in the fluorescent image can be accomplished without using a cytoplasmic marker. Cell boundary information can thereby be deduced from the nuclear image alone without the cytoplasmic image.

Therefore, in such methods, the accuracy of cell boundary identification is not adversely affected by the cell confluency state.

The cells in the image can be classified as mono-nucleated, bi-nucleated, or multi-nucleated based on the number of cell nuclei within each cell. In addition, the frequency of occurrence of micronuclei in cells in the fluorescent image can be determined based on the number of micronuclei within each cell. Other measurements such as the ratio of mono-nuclei to micronuclei can also be obtained. The same methods can be extended to split nuclei clusters in the nuclear image into individual nuclei, e.g., for counting purposes.

Identification and Counting of Main Nuclei in Cells

Figure 1A:
FIGS. 1A-1C are exemplary fluorescent images of a cell-containing sample, obtained using two stains.
Figure 1B:
Figure 1C:
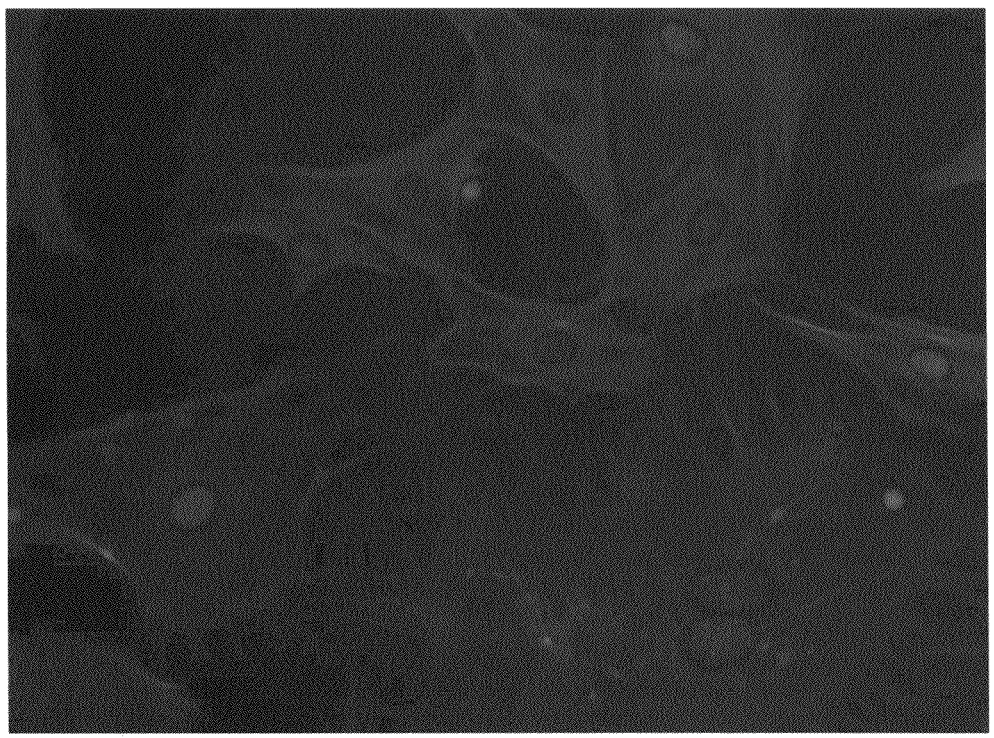
Figure 2:
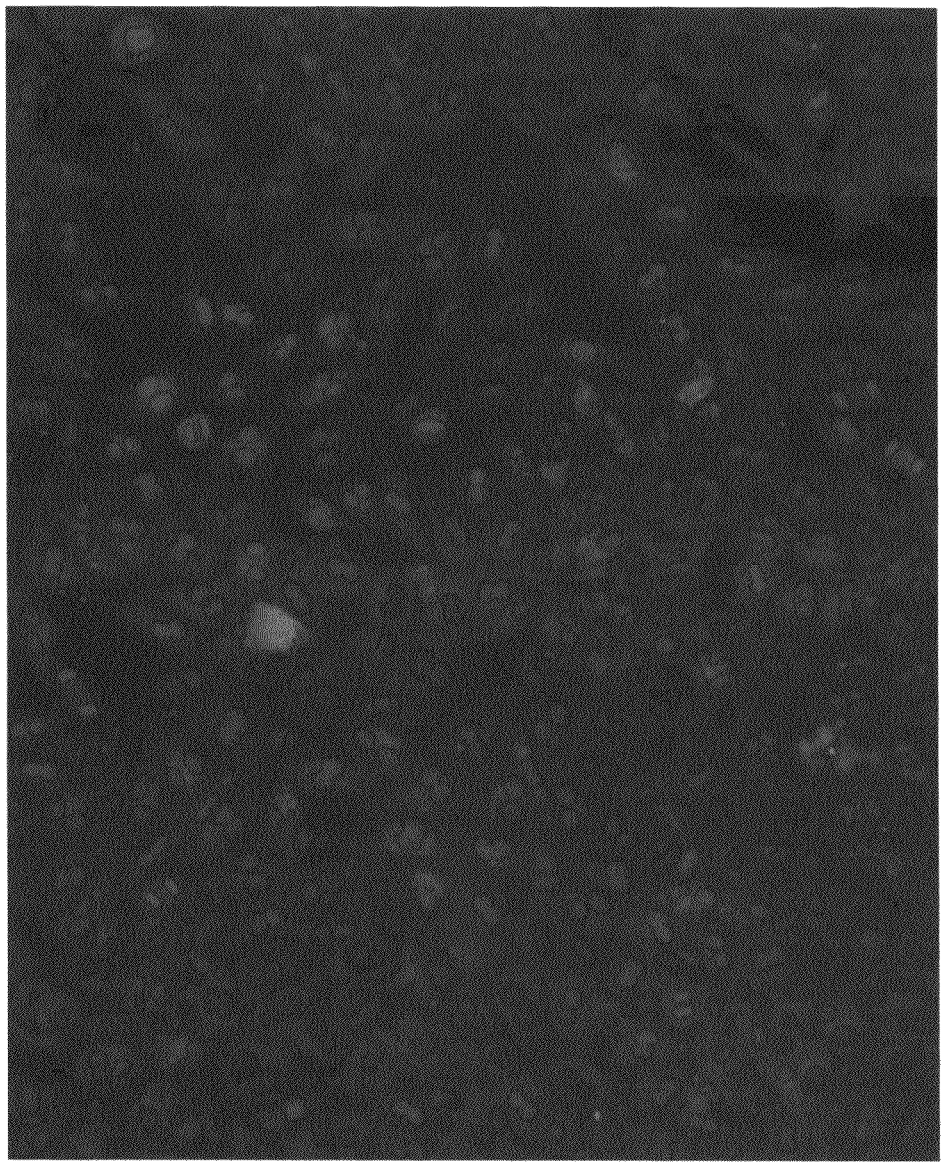
FIG. 2 shows an exemplary fluorescent image of a cell-containing sample having high confluency.
Figure 3:
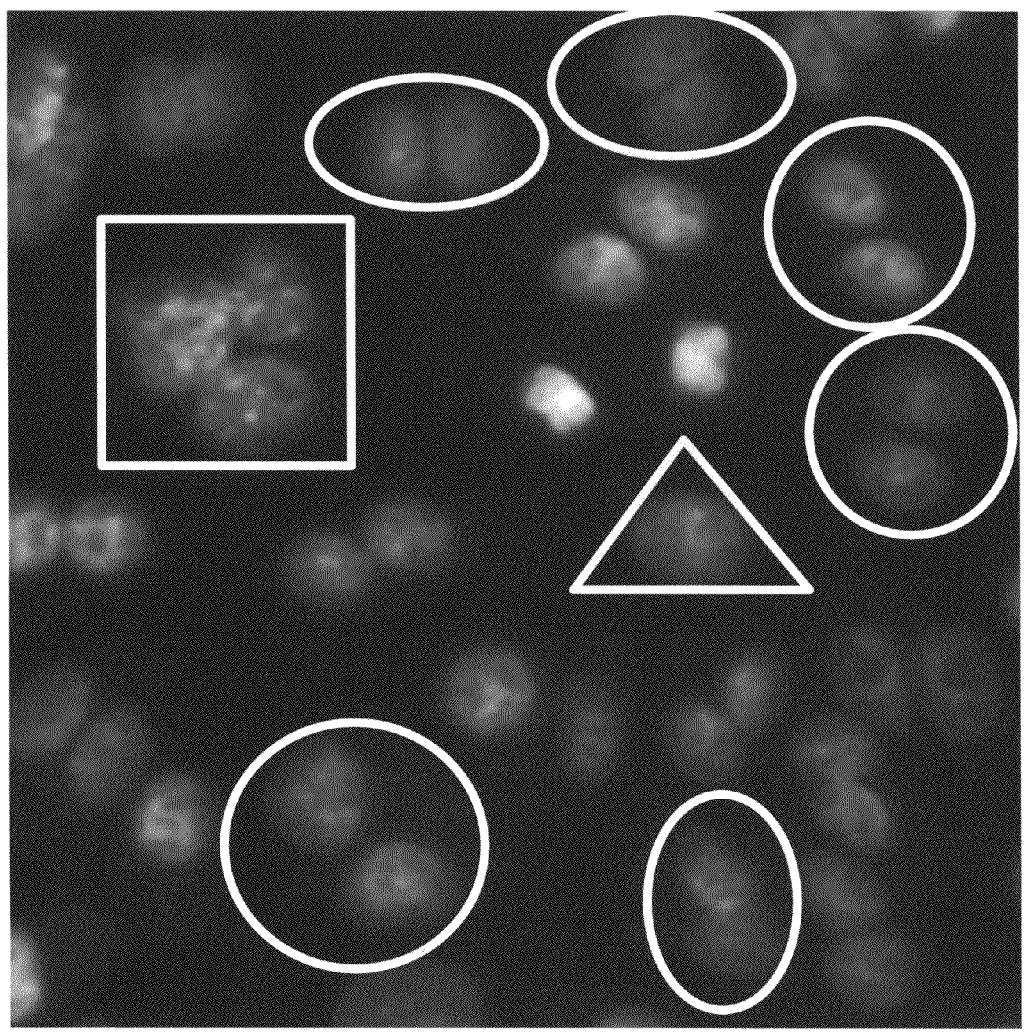
FIG. 3 shows an exemplary fluorescent image of a cell-containing sample stained with a nuclear marker, where the sample contains multi-nucleated cells.

FIG. 3 shows an exemplary image of a cell sample stained with a nuclear marker. In FIG. 3, images of nuclei clusters are visible above a dark/contrasting background. Each nuclei cluster can contain a single nucleus, a pair of touching nuclei, or more than two touching nuclei. For example, in FIG. 3, the three nuclei clusters marked by the three ellipses each contain a pair of touching nuclei; the nuclei cluster marked by the square contains three touching nuclei; and the nuclei cluster marked by the triangle contains a single nucleus. Each of these nuclei clusters likely belongs to a single cell and does not share the cell with other nuclei clusters due to its relatively large separation from other nearby nuclei clusters. In contrast, for the three pairs of nuclei clusters marked by the three circles in FIG. 3, each nuclei cluster in each of the three pairs contains only a single nucleus, and each pair of the three pairs of nuclei clusters likely share a single common cell due to their close proximity to each other.

Figure 4:
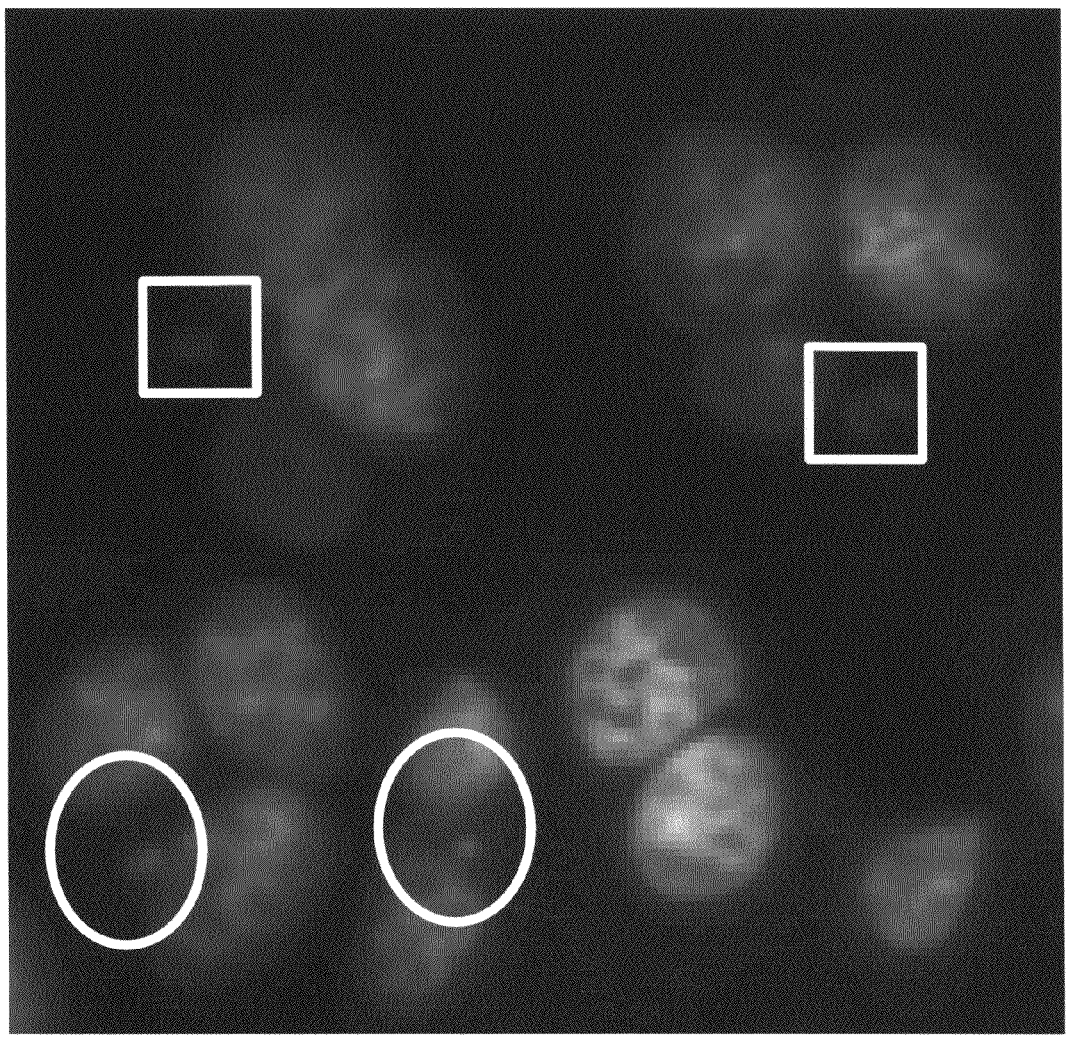
FIG. 4 shows an exemplary fluorescent image of a cell-containing sample stained with a nuclear marker, where the sample contains micro-nucleated cells.

FIG. 4 is another exemplary image of a cell sample stained with a nuclear marker. In FIG. 4, images of nuclei clusters are visible above a dark/contrasting background. Each nuclei cluster can contain a single nucleus, a pair of touching nuclei, or more than two touching nuclei, just as those shown in FIG. 3. However, in addition to nuclei clusters containing normal-sized nuclei (or main nuclei, as described herein), a number of micronuclei are visible above the dark/contrasting background in this image. Some of the micronuclei are referred to herein as "attached" micronuclei, i.e., those micronuclei that touch a main nucleus. Other micronuclei are referred to herein as "unattached" micronuclei, i.e., those micronuclei that are isolated from any main nucleus. For example, in FIG. 4, the two micronuclei enclosed in the two ellipses are attached micronuclei, and the three micronuclei enclosed in the two squares are unattached micronuclei. Each of the two attached micronuclei likely belongs to the respective cell containing the nuclei cluster to which the micronucleus is attached. In this example, one attached micronuclei belongs to the tri-nucleated cell in the lower left corner of the image, and the other attached micronucleus belongs to the bi-nucleated cell in the lower middle of the image. In addition, each of the three unattached micronuclei likely belongs to the nuclei cluster that is in the micronucleus' closest proximity. Specifically, one unattached micronucleus belongs to the tri-nucleated cell in the upper left corner of the image, and the other two unattached micronuclei belong to the tri-nucleated cell in the upper right corner of the image. Although there are possible disagreements in the scientific community as to whether "attached micronuclei" are true "micronuclei" or simply "blebs," "attached micronuclei" are considered as micronuclei and referred to as such in the instant disclosure. A user can eliminate these "attached micronuclei" from consideration in his/her analysis by setting appropriate micronuclei parameters specifying the minimum distance between a micronucleus and a main nucleus in a cell.

Although it is relatively intuitive for a person to manually determine the number of cells in an image, identify nuclei clusters and micronuclei, assign each nuclei cluster and micronucleus to its proper cell, and count the number of nuclei and micronuclei in each cell based on such nuclear images, manual identification and counting can be subjective, tedious, and time-consuming, especially where hundreds or thousands of cells are present. It is therefore impractical to process manually samples with a large number of cells, or a large number of cell samples, to measure micronuclei induction in each sample, as is typically done when testing the effects of a drug candidate.

The present disclosure describes image processing methods, such as computer-implemented methods, that automatically segment nuclei clusters from an image of cell nuclei, determine whether a nuclei cluster contains a single nucleus, a pair of touching nuclei, or more than two touching nuclei based on the number of indentations around the nuclei clusters and/or other shape/size factors. In addition, the methods assign each nuclei cluster to a cell. In some instances, a cell may contain a single nuclei cluster, each of which contains a single nucleus, a pair of touching nuclei, or two or more touch nuclei; in other instances, a cell may contain a pair of closely spaced nuclei clusters, each of which contains a single nucleus. In some rare occasions, a cell may contain a plurality of nuclei clusters, each of which may contain one or more nuclei. A tally of the nuclei within each cell can be obtained based on the assignment of the nuclei clusters.

The number of nuclei within each nuclei cluster is determined based on a number of indentations around the perimeter of the nuclei cluster. The indentations on the perimeter of a nuclei cluster are identified by calculating a convex hull of the nuclei cluster in the segmented image, and subtracting the nuclei cluster from its respective convex hull. The indentations around each nuclei cluster can be enhanced to facilitate graphically splitting the nuclei cluster into its constituent nuclei. A cell map showing the split nuclei in each cluster can be presented to a user. The splitting result can also be used to verify the nuclei counts within the nuclei clusters.

The same methods can be applied to segmenting attached and unattached micronuclei from the nuclear image and assigning each of the micronuclei to a cell. The cell assignment of each micronucleus is based on a distance between the micronucleus and its closest nuclei cluster. Upon completion of the assignment, a tally of the micronuclei within each cell can be obtained.

Once the number of main nuclei and the number of micronuclei are counted for each cell, the cells can be categorized according to the number of main nuclei as mono-nucleated, bi-nucleated, or multi-nucleated. The frequency of micronuclei formation (i.e., micronuclei per cell) can be determined based on the number of micronuclei and the number of cells. The ratio between mono-nuclei and micronuclei can be obtained based on the number of mono-nucleated cells and the number of micronuclei in the cell-containing sample.

FIGS. 5A-5E show an overview of the process of main nuclei segmentation, counting and grouping based on a nuclear image of a cell sample.

FIG. 5A is a fluorescent image (or grayscale intensity image) of the cell sample stained with a nuclei marker. When the stained cell sample is exposed to light of an appropriate excitation frequency, the nuclei marker fluoresces and light emission from the nuclei marker is recorded in the nuclear image. Therefore, areas of higher intensities in the image indicate sites of nuclei within cells in the cell sample.

In addition to light emitted from nuclei sites in the cell sample, a nuclear image may also contain stray signals emitted or reflected from other impurities or cell fragments in the sample, or from the ambient environment. These background signals—sometimes referred to as noise—pose challenges to identifying and isolating nuclei images from the raw fluorescent nuclear image. In addition, emissions from the nuclei themselves can be uneven resulting in uneven intensities at the nuclei sites as well. For accurate counting, a pre-processing step can be used to obtain from the raw fluorescent image a segmented binary image containing only the main nuclei clusters on a contrasting background. A binary image is a digital image that has only two possible values for each pixel. Typically the two colors used for a binary image are black and white though any two colors can be used. The color used for the object(s) in the image is the foreground color while the rest of the image is the background color.

Segmentation methods have found other applications in the field of computer image processing. The main task in segmentation is to distinguish objects of interest from the background in an image. The present methods segment the raw nuclear image into a binary image containing nuclei-clusters with smooth and well-defined boundaries. The segmentation can be based on a user or machine-specified minimum intensity above a local background intensity. The grayscale image is separated into background and foreground regions based on this minimum intensity value. Further, it is also possible to smooth out variations in the background intensity by setting all pixels below a threshold intensity to zero, leaving pixels with brightness above threshold unchanged or set to a uniform foreground value.

In some implementations, other inputs such as maximum and minimum width of the nuclei or nuclei clusters can be used to filter out signals from impurities, cell fragments, and artifacts. In some implementations, the edges of nuclei clusters in the segmented image are smoothed out based on the maximum, minimum, and/or average size of a main nucleus.

In some implementations, the preprocessing or segmentation of the main nuclei clusters does not have to result in a binary image as long as the nuclei clusters are clearly isolated from the background in the image.

After the initial processing and segmentation of the raw nuclear image of the cell sample, a segmented image comprising one or more nuclei clusters is obtained. FIG. 5B shows an exemplary segmented binary image based on the raw nuclear image in FIG. 5A. The segmented image contains isolated main nuclei clusters on a contrasting background. All pixels of the nuclei clusters have a uniform intensity. The main nuclei clusters may contain a single nucleus, a pair of touching nuclei, or more than two touching nuclei.

The number of nuclei contained in each main nuclei cluster can be ascertained based on the number of indentations along the boundaries of each nuclei cluster. To obtain the number of indentations for each nuclei cluster, a convex hull is first calculated for each nuclei cluster in the image. In mathematics, the convex hull for a set of points X in a real vector space V is the minimal convex set containing X. Because cell nuclei are mostly of an oval shape, when two or more nuclei touch and form a nuclei cluster, indentations are formed along the boundary, or perimeter, of the cluster. In the segmented image containing nuclei clusters, each cluster is a non-empty finite set of points, each point in the set being a pixel on the image within boundary of the nuclei cluster. Methods for computing the convex hull of a finite set of points are known in the field of computational geometry. Details of applicable algorithms for carrying out a convex hull calculation are available in the literature, and it is within the capability of one skilled in the art to adapt and implement such algorithms to images such as of cell nuclei, as described herein. Suitable algorithms are based on numerical, as well as analytical, methods. An example reference on the convex hull calculation is the GNU Octave Manual Version 3, by John W. Eaton, David Bateman, and Søren Hauberg, the content of which is hereby incorporated by reference.

Once the convex hull of each nuclei cluster is obtained, either by direct calculation or through an external software module, the indentations around each nuclei cluster can be obtained by comparing the nuclei cluster to its respective convex hull. In some implementations, where by subtracting the segmented image of the nuclei clusters from a filter image containing the respective convex hulls, a resulting image containing only the indentations can be obtained. In some implementations, the information regarding the difference between the nuclei cluster and its respective convex hull can be visually depicted. In some implementations, the information is stored as data for each pixel in the image. FIG. 5C is an exemplary image showing the indentations resulted from comparing the segmented image containing the main nuclei clusters and the filter image containing their respective convex hulls. In FIG. 5C, the indentations are found around nuclei clusters containing two or more touching nuclei. No indentation is found around nuclei clusters containing a single nucleus. In some implementations, a step for filtering out stray pixels resulted from the subtraction can be performed.

The correlation between the number of indentations along the boundary of a nuclei cluster and the number of nuclei contained therein can be found based on statistical or mathematical models, or heuristic rules. For example, a nuclei cluster containing no indentation likely contains a single nucleus; a nuclei cluster containing a single indentation or a pair of opposing indentations likely contains two nuclei; a nuclei cluster containing three indentations likely contains three nuclei; and so on. By tallying the number of indentations along each nuclei cluster, a first nuclei count can be obtained indicating the number of nuclei contained in the nuclei cluster. Other factors can also be considered when determining the number of nuclei within each nuclei cluster, such as maximum and minimum sizes/widths of a nucleus in the cell sample, total area of a nuclei cluster, shape factor of a nuclei cluster (e.g., how circular, or elongated the nuclei cluster is), and so on. In some implementations, nuclei splitting result for each poly-nucleated (i.e., bi- or multi-nucleated) nuclei cluster can also be used in determining the number of nuclei within the nuclei cluster.

In some instances, the cell sample contains cells having a pair of closely-spaced, yet un-touching nuclei. Each of the nuclei within the pair is represented as a separate nuclei cluster during image segmentation. In order to determine whether a nuclei cluster having a single nucleus is a lone nucleus in a mono-nucleated cell or one of a pair of nuclei in a bi-nucleated cell, a distance is computed between the nuclei cluster and an adjacent nuclei cluster and compared to a user specified or pre-determined threshold minimum distance between nuclei within a cell. In some implementations, a nuclei cluster containing two or more touching nuclei is assumed to be the only nuclei cluster within a cell, and excluded from the grouping analysis, such as shown in FIG. 5D. In such implementations, the distance between each pair of adjacent nuclei clusters among the remaining single-nucleated nuclei clusters is determined and compared to a minimum threshold distance. If the distance between a pair of adjacent mono-nucleated nuclei clusters is smaller than the minimum threshold distance, the pair of adjacent mono-nucleated nuclei clusters is group together and associated with a common cell. In some implementation, other factors like the similarity of morphology and texture between adjacent nuclei are considered when determining if joining the close nuclei into one cell.

In some implementations, when the cytoplasm image is also available, grouping of adjacent mono-nucleated nuclei clusters can be optionally verified by checking the intensity levels of the cytoplasm image between the two adjacent mono-nucleated clusters. The general assumption in this verification process is that if two adjacent mono-nucleated nuclei clusters belong to the same cell, the intensity of the cytoplasm image between the two nuclei clusters would be relatively uniform without any intensity gap. However, if the two mono-nucleated nuclei clusters belong to different cells, then there would be an intensity gap in the cytoplasm image between the two nuclei clusters due to the absence of cytoplasm between the two different cells. This verification step would improve the accuracy of nuclei assignment to cells. Although it does require processing of the cytoplasm image, segmentation of the cytoplasm image is not required for the cell assignment verification. Compared to segmentation of the cytoplasm image, checking for intensity gaps in the cytoplasm image requires much less computation and process time.

In some implementations, it is assumed that each cell may contain more than one nuclei cluster, regardless of whether the nuclei cluster contains more than one nucleus. For example, a bi-nucleated nuclei cluster may be assigned to the same cell as a mono-nucleated nuclei cluster, resulting in a tri-nucleated cell. In such implementations, the assignment of nuclei clusters to a cell is based on the distance between the nuclei cluster and its adjacent nuclei cluster. For example, the pixels within each nuclei cluster can be checked to see if any is within a predetermined or user specified minimum distance from a pixel in another nuclei cluster, and if there is such a pixel, then the two nuclei clusters are assigned to the same cell. In some implementations, other factors such as average, maximum, minimum cell size and/or similarity in nuclei morphology and intensity texture can be used to determine whether an assignment of a given nuclei cluster to a cell would likely to be improper. In some implementations, the same verification step based on cytoplasmic intensity between the nuclei clusters can be performed as described with respect to grouping two mono-nucleated nuclei clusters.

After the grouping of nuclei clusters into cells, a second nuclei count can be obtained for each of the cells found in the image. For example, in the case where each nuclei cluster containing two or more touching nuclei is assigned to a separate cell, the total count of nuclei within that cell is the same as the nuclei count within the nuclei cluster. In the case where two mono-nucleated nuclei clusters are assigned to the same cell, the total count of nuclei within the cell is the sum of the nuclei count for both nuclei clusters, which is two. In the case where multiple nuclei clusters are assigned to a single cell, the total count of nuclei within the cell is the sum of the nuclei counts for all constituent nuclei clusters assigned to the cell.

Once the total nuclei count for each cell is obtained, a number of results can be obtained and presented to a user. For example, the nuclei count for each cell can be presented. Alternatively, the cells in the raw image can be categorized as mono-nucleated, bi-nucleated, or multi-nucleated, and so on based on the number of nuclei contained within each of the cells. In some implementations, a tally of cells in each category can be presented to the user. In some implementations, a cell map can be presented to the user showing one or more nuclei clusters marked by a common characteristic of a particular category to which its cells belong. For example, all nuclei clusters assigned to mono-nucleated cells, bi-nucleated cells, and multi-nucleated cells are marked respectively by a different characteristic color in the cell map. In some implementations, proportion of multi-nucleated cells within the cell sample can also be obtained, and used as an indicator for cytotoxicity. In some implementations, cell boundaries can be obtained by using a water-shed transform of the nuclei clusters according to their cell assignments.

Nuclei Splitting Based on Enhanced V-Indentations

FIGS. 6A-6D shows another aspect of the methods for counting main nuclei within nuclei clusters, i.e., splitting the bi- or multi-nucleated nuclei clusters into their constituent nuclei based on the indentations around the nuclei clusters.

Various methods of separating an image of a nuclei cluster into its constituent nuclei have been considered in the field of biomedical image processing. A commonly used algorithm is the watershed algorithm. The watershed algorithm can be applied to a segmented image obtained from a fluorescent nuclear image. The term "watershed" comes from a graphic analogy that likens a gray-level image to a topographic surface where bright areas are considered "high" and dark areas are considered "low." In this algorithm, it is assumed that holes have been punched in each regional minimum on the topographic surface, and if the surface is "flooded" from these holes, the water will progressively flood the "catchment basins" (i.e., the set of points on the surface whose steepest slope paths reach a given minimum) of the image. At the end of this flooding procedure, each minimum is completely surrounded by the "watershed lines."

Figure 6B:
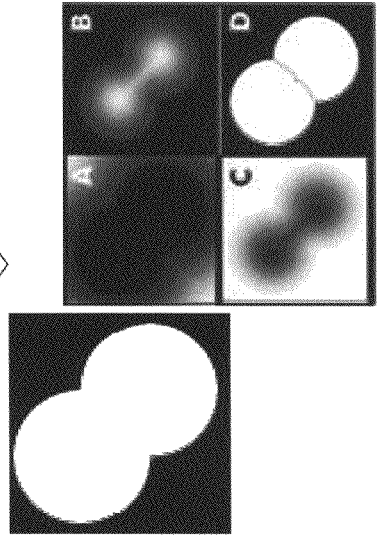
FIGS. 6A-6D show an exemplary process for splitting nuclei clusters into their constituent nuclei by enhancing indentations on the nuclei clusters.
Figure 6C:
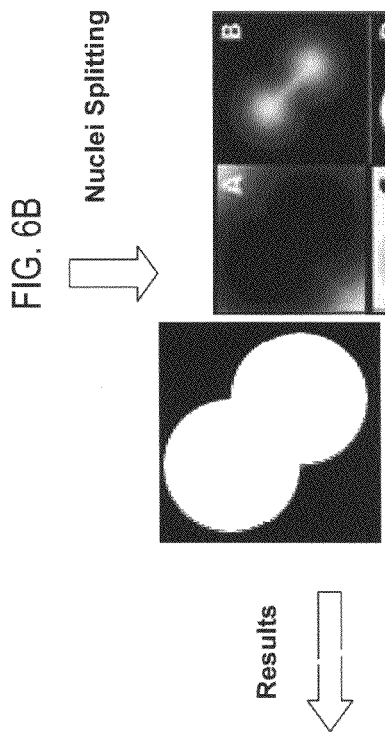

In order to obtain the boundary lines between constituent nuclei within a nuclei cluster in a segmented binary image, the nuclei cluster needs to have a topology with the local minima situated at the centers of the constituent nuclei, such that the contours of the nuclei cluster correspond to watershed lines and the nuclei correspond to catchment basins surrounded by the watershed lines. In order to achieve such a result, a distance transform can be performed on the segmented image before the watershed transform is applied. A distance transform for a digital image contains a distance value for each pixel of the image, where the distance is between the pixel and its nearest non-background pixel. FIG. 6C shows an exemplary distance transform and watershed transform applied to an exemplary binary nuclei cluster comprising two touching nuclei (shown in the upper left corner of FIG. 6C). The distance transform of the binary image results in image A of FIG. 6C. This image is not very useful, because there is only one catchment basin spanning the entire image. The distance transform of the image's complement results in image B of FIG. 6C. Image B is closer, but its catchment basins are not in the center of the nuclei. Negating image B results in image C of FIG. 6C which exhibits one catchment basin for each nucleus, and image C is ready for the watershed transform. When the watershed transform is applied to image C, the boundary between the two nuclei is obtained, as shown in image D of FIG. 6C.

Although the watershed transform has been used in segmenting nuclei clusters into their constituent nuclei, it has several limitations arising from the fact that it relies on touching objects exhibiting a narrow "neck" in the region of contact. The watershed transformation process for object segmentation is notoriously error-prone. Considerable effort has been devoted to the design of algorithms for generating the correct set of "markers" to guide the object segmentation. In the present method, these markers for the narrow necks along the boundaries of the nuclei clusters have been obtained by comparing the nuclei clusters to their respective convex hulls. In order to improve the effectiveness of the watershed method, the indentations are enhanced in size. For example, the enhancement can be carried out by elongating the tips of the V-indentations, or simply by enlarging the size of the indentations. The enhancement of the indentation improves the accuracy of the watershed method in splitting the nuclei clusters into their constituent nuclei.

Figure 6A:
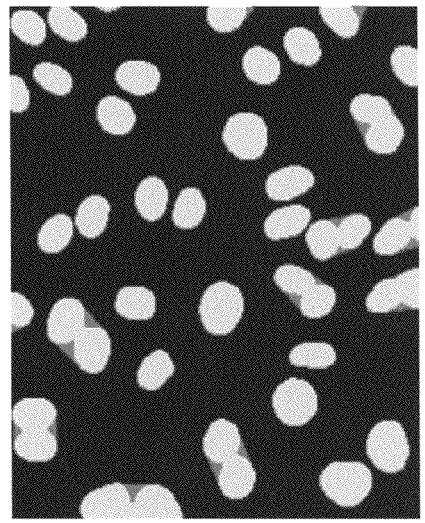
Figure 6D:
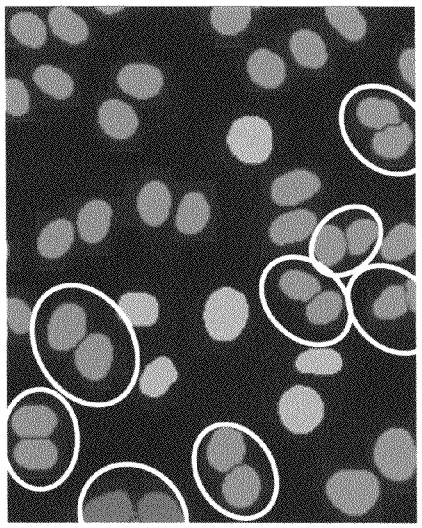

As shown in FIG. 6A, first, indentations are obtained for bi-nucleated nuclei clusters and multi-nucleated nuclei clusters by subtracting the nuclei clusters from their respective convex hulls. In FIG. 6B, the indentations are enhanced by enlarging their sizes. The enhanced indentations result in narrower "necks" in the nuclei clusters. And the number of indentations also provides information as to the number of nuclei contained in each nuclei cluster that is to be split. In FIG. 6C, the usual standard distance transform and watershed transform can be performed on the nuclei clusters with the enhanced indentations, and nuclei boundaries are obtained for each bi-nucleated nuclei cluster and multi-nucleated nuclei cluster. In FIG. 6D, the nuclei resulted from the splitting can be presented in a cell map. The cell map presented can identify each nucleus according to the category of its cell, i.e., mono-nucleated, bi-nucleated, or multinucleated. In this example, the multi-nucleated cells are marked as green, and nuclei of one such multi-nucleated cell are shown on the left edge of the cell map; bi-nucleated cells are marked as orange, and pairs of touching nuclei of such bi-nucleated cells are shown in various locations of the cell map; mono-nucleated cells are marked as gray, and nuclei of such mono-nucleated cells are shown in various locations of the cell map. The nuclei boundaries obtained from the nuclei splitting process are displayed in the cell map, for example, for those nuclei clusters marked by the ellipses overlaid on the cell map in FIG. 6D.

Identification and Counting of Micronuclei in Cells

In addition to proper identification, grouping, and counting of main nuclei in cells, proper identification, cell assignment, and counting of micronuclei are also necessary to obtain the correct measurement of micronuclei induction.

In a nuclear image, a micronucleus can be isolated from, or unattached to, the main nuclei of its cell; or it can be attached to a main nucleus of its cell. In order to segment micronuclei structures out of the raw nuclear image, the same methods used to segment the main nuclei clusters can be utilized, except that parameters such as minimum intensities above local background, maximum and minimum sizes for both micronuclei and main nuclei are used for the segmentation. The micronuclei parameters can be user specified, or predetermined in the software implementing the methods herein, or the system.

A segmented image comprising isolated or unattached micronuclei can be obtained based on intensity above local background and maximum and minimum size specified for micronuclei.

The identification of attached micronuclei is more involved than identification of unattached micronuclei. First, main nuclei clusters are identified as before, except now when the boundaries of the main nuclei clusters are smoothed out, the smoothing filter is based on size of a micronucleus, thus allowing sufficient resolution to keep any micronuclei that are attached to a main nucleus intact in the main nuclei clusters. By subtracting the segmented image comprising only the main nuclei clusters from the segmented image comprising main nuclei clusters and attached micronuclei, a resulting image comprising only the attached micronuclei is produced. Artifacts and noise resulted from this subtraction can be filtered out by identifying indentations around the attached micronuclei.

When the unattached micronuclei and attached micronuclei are both identified in a segmented image, each is assigned to a cell containing at least one main nuclei cluster. A maximum and a minimum distance between a micronucleus and a main nucleus in a cell can be specified by a user or predetermined by the software or system. These distances can be used to filter out artifacts and dead DNA fragments in the nuclear image that are located outside of this acceptable distance range, so that they are not mistakenly identified as micronuclei. The assignment of a micronucleus to a cell is based on the distance between the micronucleus and an adjacent main nucleus. An attached micronucleus is assigned to the cell containing the main nuclei cluster to which the micronucleus is attached. An unattached micronucleus is assigned to a cell containing a main nucleus that is in the closest proximity to the micronucleus. There are certain debates as to whether attached micronuclei (or nuclear materials attached to a main nucleus) are in fact micronuclei for the purpose of measuring micronuclei induction in a cell sample. A user can specify the non-zero minimum distance between a micronucleus and a main nucleus to eliminate attached micronuclei from being identified and considered in micronuclei scoring.

Figure 7:
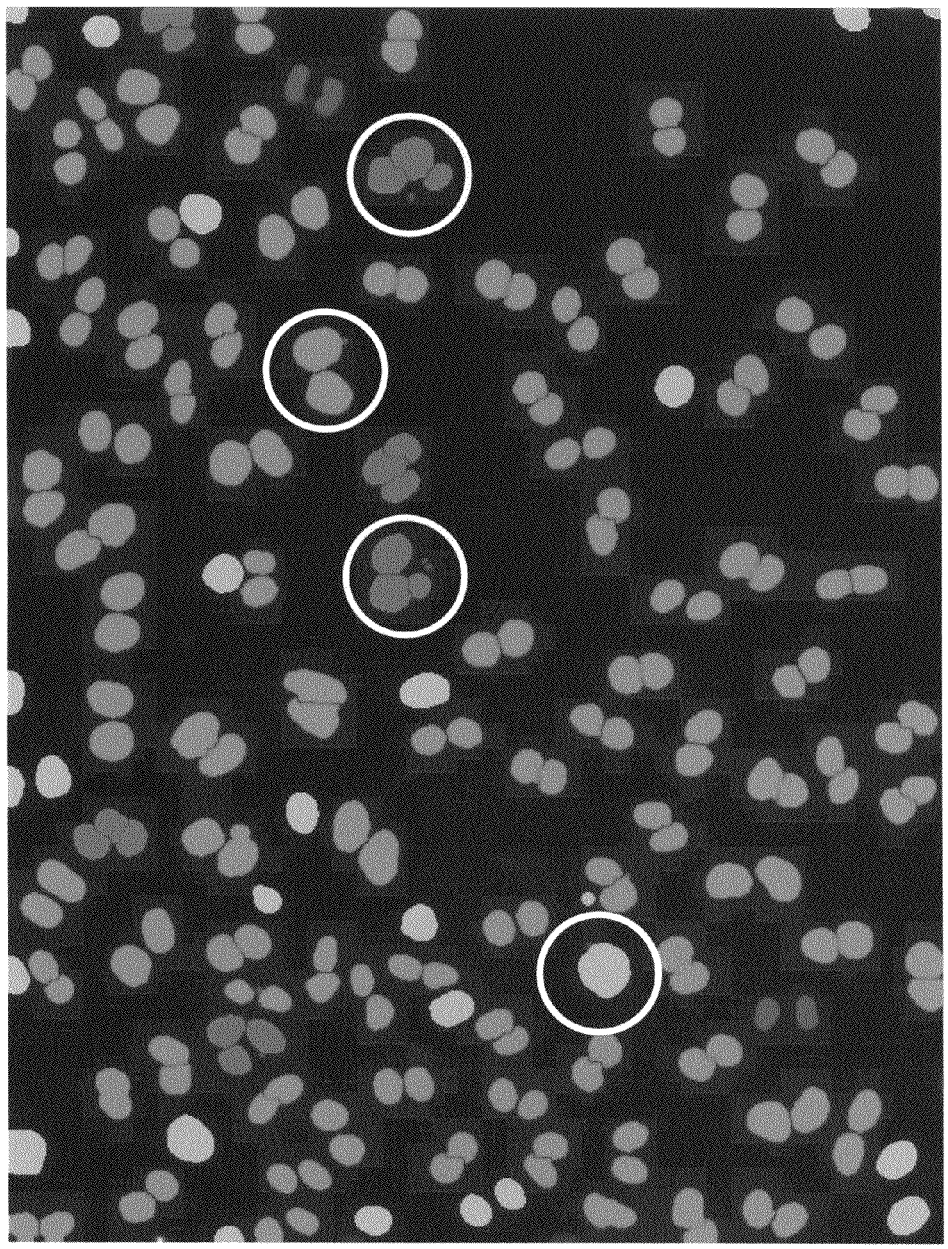
FIG. 7 shows an exemplary cell map showing attached and unattached micronuclei in cells of a cell-containing sample.

Once each identified micronucleus is assigned to a respective cell, a count of micronuclei in each cell can be obtained. Based on the total number of micronuclei and the total number of cells in the sample, the frequency of micronuclei formation can be calculated. Images of micronuclei can be presented in the cell map along with the main nuclei in the cell sample. FIG. 7 is an exemplary cell map showing main nuclei and micronuclei. The nuclei are marked with different colors indicating the categories of their respective cells, e.g., gray represents mono-nucleated cells, orange represents bi-nucleated cells, and green represents multinucleated cells. The micronuclei in the cell map are marked purple. The micronuclei can be attached or unattached to a main nucleus, each micronucleus may be the only micronucleus or one of a few micronuclei in its cell, and each micronucleus may share a cell with a single main nucleus, a pair of main nuclei, or multiple main nuclei. Examples of these above scenarios can be seen in FIG. 7 for those cells marked with circles.

Figure 8:
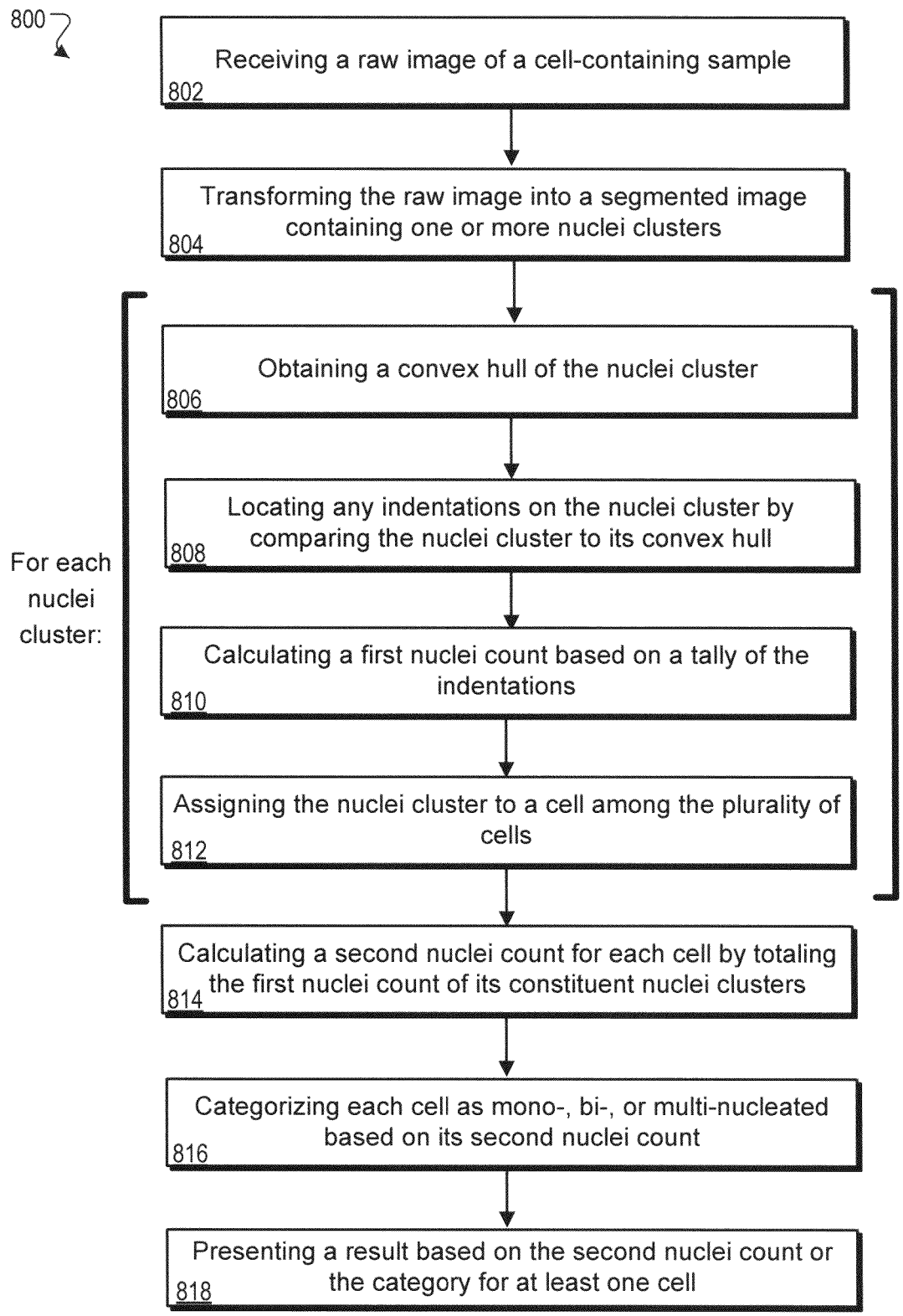
FIG. 8 shows a flow diagram of an exemplary process for counting nuclei of cells in a cell-containing sample using a convex hull method.

FIG. 8 is a flow diagram of an exemplary process 800 for counting nuclei of cells in a cell-containing sample using the methods disclosed herein. The exemplary process 800 includes a step 802 for receiving a raw image of a cell-containing sample, a step 804 for transforming the raw image into a segmented image containing one or more nuclei clusters; then for each nuclei cluster, the exemplary process 800 further includes: a step 806 for obtaining a convex hull of the nuclei cluster, a step 808 for obtaining any indentations on the nuclei cluster by comparing the nuclei cluster to its convex hull, a step 810 for calculating a first nuclei count based on a tally of the indentations, and a step 812 for assigning the nuclei cluster to a cell among the plurality of cells; then for each cell, the exemplary process 800 further includes a step 814 for categorizing each cell as mono-, bi-, or multi-nucleated based on its second nuclei count; then the exemplary process 800 includes a step 818 for presenting a result based on the second nuclei count or the category for at least one cell. Exemplary process 800 describes one possible implementation of the instant nuclei counting methods. Not all steps in the exemplary process 800 are required in a particular implementation.

In some implementations, step 802 for receiving a raw image of a cell-containing sample can be invoked by a user entering a source location for the raw image in a software module implementing the nuclei counting methods described herein. In some implementation, step 802 is automatically carried out by a software module that is directly coupled to an imaging system after the imaging system captures an image of the cell-containing sample. In some implementations, the raw image is a fluorescent image of cells stained with a nuclear marker. In some implementations, the cells are not stained by a cytoplasm marker or a cell membrane marker. In some implementations, the raw image is a monochromatic image produced using a single channel of the imaging system. In some implementations, the raw image is an intensity image where each pixel in the image records an intensity value.

In some implementations, step 804 for transforming the raw image into a segmented image containing one or more nuclei clusters is carried out by a software module. In some implementations, the transformation is based on one or more nuclei parameters entered by a user or predetermined in the software module. The one or more nuclei parameters can include a maximum and a minimum width for a nucleus (or sometimes referred to as a "main" nucleus when being distinguished from a micronucleus), and a minimum intensity above local background. These nuclei parameters can be used to filter out stray signals recorded in the raw image that are due to background noise, impurities, and non-nuclear objects. For example, one or more of the following procedures can be carried out to transform the raw image into a segmented image comprising nuclei clusters: pixels having an intensity value below the minimum intensity above local background are set to zero to eliminate background noise in the raw image; pixels having an intensity above the minimum intensity above location background are set to a non-zero foreground intensity value to eliminate non-uniformity within nuclei clusters; the maximum and minimum widths for a nucleus are used to filter out objects in the raw image that are unlikely to be a nucleus or a nuclei cluster due to their size; and maximum and minimum widths of a nucleus are also used to smooth out the edges of nuclei clusters identified in the raw image such that they appear as clusters of oval shaped objects (i.e., cell nuclei). In some implementations, the segmented image obtained after the above transformations is a binary image with the nuclei clusters having a foreground intensity and the rest of the image having a background intensity (e.g., zero).

In some implementations, a series of steps (e.g., steps 806, 808, 810, and 812) are performed for each nuclei cluster in the segmented image. In some implementations, step 806 for obtaining a convex hull of the nuclei cluster is performed by an external mathematics or geometry software module. All pixels (points) within the nuclei cluster are provided to the external software module, and the external software module returns a convex hull of the nuclei cluster which is the minimum convex set (of pixels/points) that includes the pixels in the nuclei cluster.

Because cell nuclei are generally oval in shape, touching nuclei naturally give rise to indentation around the nuclei cluster comprising two or more touching nuclei. These indentations on a nuclei cluster can be detected by comparing the nuclei cluster to its respective convex hull. In some implementations, step 808 for locating any indentations on the nuclei cluster by comparing the nuclei cluster to its convex hull further comprises obtaining a filter image comprising the convex hull of the nuclei cluster and subtracting the nuclei cluster in the segmented image from its respective convex hull in the filter image. In some implementations, the convex hull for each nuclei cluster is stored individually and associated with its respective nuclei cluster, such that subtraction or comparison of the convex hull and its associated nuclei cluster can be carried out on a cluster-to-cluster basis. In some implementations, convex hulls for all nuclei clusters are stored in the filter image, and the subtraction or comparison of the convex hulls and their associated nuclei clusters are carried out for the entire image.

Step 812 for assigning the nuclei cluster to a cell among the plurality of cells can further comprise receiving a nuclei parameter specifying a maximum distance between nuclei in a poly-nucleated cell, and assigning nuclei clusters to the same cell only when the distance between the nuclei clusters are smaller than the maximum distance specified. In some implementations, multi-nucleated clusters are presumed to be the only nuclei cluster within a cell, and the cell assignment based on distance is only carried out for mono-nucleated nuclei clusters. In some implementations, multi-nucleated nuclei clusters can share a cell with another nuclei cluster, and cell assignment based on distance is carried out for all nuclei clusters. In such implementations, a threshold size for cells may be used to prevent too many nuclei clusters from being mistakenly assigned to the same cell.

In some implementations, cell assignment based on distance is carried out for mono-nucleated nuclei clusters, and if two mono-nucleated nuclei clusters are sufficiently closely spaced, they can be assigned to a common cell. In some implementation, the similarity of nuclei clusters can be calculated to improve the accuracy of cell assignment since all nuclei in a multinucleated cell usually exhibit similar morphology and staining intensity. In such implementations, the cell assignment can be further verified by using a second raw image comprising stained cytoplasm of the cells in the cell-containing sample. Steps for receiving the second raw image and verifying cell assignment of the two closely spaced mono-nucleated clusters can be performed. The verification is carried out by detecting an intensity gap between locations of the two closely spaced mono-nucleated nuclei clusters in the second raw image. The verification is based on the assumption that if the two closely spaced mono-nucleated nuclei clusters belong to the same cell, the intensity of the cytoplasm in the cell would be relatively uniform, and no intensity gap would be detected. On the other hand, if the two closely spaced mono-nucleated nuclei clusters belong to two different cells, there would be an intensity gap between the cytoplasm in each of the two different cells. Since detection of intensity gap in a cytoplasm image is not nearly as computationally intensive as segmenting a cytoplasm image, this step can be performed to improve the accuracy of cell assignment without significantly increasing processing time.

Because a cell can comprise more than one nuclei cluster, the total number of nuclei in each cell can be calculated by first calculating a first nuclei count for each nuclei cluster assigned to the cell based on the number of indentations detected on the nuclei cluster (step 810), and by totaling the first nuclei counts of all nuclei clusters assigned to the cell (step 814). In some implementations, where each multi-nucleated nuclei cluster is presumed to be the only nuclei cluster in a cell, the nuclei count for the cell is the same as the nuclei count for the multi-nucleated nuclei cluster. In such implementations, only mono-nucleated nuclei clusters can be assigned to the same cell as another mono-nucleated nuclei cluster, and the total number of nuclei in such cells is two.

Optionally, step 814 for categorizing each cell as mono-nucleated, bi-nucleated, or multi-nucleated based on the second nuclei count (or total number of nuclei) for the cell can be performed when a count for cells in each category is desired.

In some implementations, optional steps can be performed to split nuclei in each of the multi-nucleated nuclei clusters in the image. The splitting can be performed by enhancing the indentations detected on the nuclei clusters. The indentations can be enhanced by enlarging the overall size of the indentations, or by elongating the tips of the indentations to further "pinch" the nuclei clusters at the indentations. After enhancing the indentations, a distance transform can be obtained based on the nuclei cluster in the segmented image with the enhanced indentations, and the boundaries between two or more nuclei in the nuclei cluster can be obtained by applying a watershed transformation on the distance transform.

Figure 9:
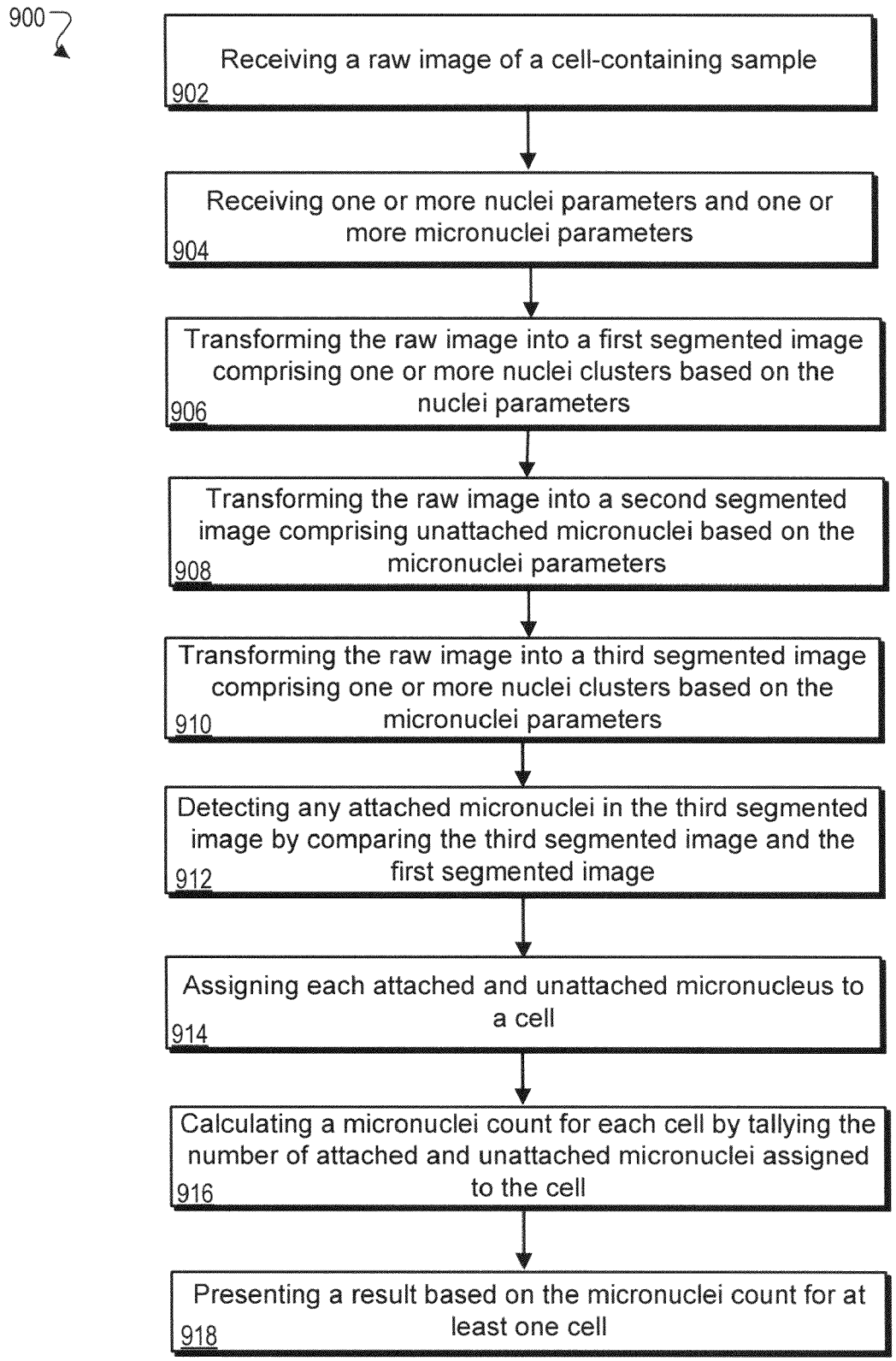
FIG. 9 shows a flow diagram of an exemplary process for counting micronuclei for cells in a cell containing sample.

FIG. 9 is a flow diagram of an exemplary process 900 for counting micronuclei for cells in a cell-containing sample. The exemplary process 900 can include one or more of the following steps: a step 902 for receiving a raw image of a cell-containing sample, a step 904 for receiving one or more nuclei parameters and one or more micronuclei parameters, a step 906 for transforming the raw image into a first segmented image comprising one or more nuclei clusters based on the one or more nuclei parameters, a step 908 for transforming the raw image into a second segmented image comprising one or more unattached micronuclei based on the one or more micronuclei parameters, a step 910 for transforming the raw image into a third segmented image comprising one or more nuclei clusters based on the micronuclei parameters, a step 912 for detecting any attached micronuclei in the third segmented image by comparing the third segmented image and the first segmented image, a step 914 for assigning each of the attached and unattached micronuclei to a cell, a step 916 for calculating a micronuclei count for each cell by tallying the number of attached and unattached micronuclei assigned to the cell, and a step 918 for presenting a result based on the micronuclei count for at least one cell.

In some implementations, the exemplary process 900 for counting micronuclei in a cell-containing sample can be carried out concurrently with the process 800 for counting nuclei in the same cell-containing sample. The steps for receiving a raw image of the cell-containing sample, and receiving one or more nuclei parameters and one or more micronuclei parameters can carried out at the same time in the same user interface. The one or more micronuclei parameters can include a maximum and a minimum width for a micronucleus in the cell-containing sample, a minimum intensity above local background for micronuclei in the raw image, and a minimum and a maximum distance between a micronucleus and a main nucleus in a cell.

In the exemplary process 900, step 906 for transforming the raw image into a first segmented image comprising one or more nuclei clusters based on the nuclei parameters can be performed the same way as described with respect to step 804 in FIG. 8. In the first segmented image, nuclei clusters do not include any attached micronuclei because the boundaries of the nuclei clusters are smoothed out according to the size of the main nucleus, and signals from the attached micronuclei are eliminated during the smoothing process. Step 908 for transforming the raw image into a second segmented image comprising unattached micronuclei is similar to step 906 except the parameters used are micronuclei parameters. Main nuclei clusters can be eliminated from the second segmented image based on a maximum size of the micronucleus that can be expected in the cell-containing sample. Step 910 for transforming the raw image into a third segmented image comprising one or more nuclei clusters based on the micronuclei parameters is similar to step 906, except that the smoothing process is performed based on the size of a micronucleus allowing sufficient resolution to keep the attached micronuclei intact in the nuclei clusters. The one or more nuclei clusters in the third segmented image are essentially the same nuclei clusters as those in the first segmented image, except one or more attached micronuclei can be found around the edges of one or more nuclei clusters in the third segmented image.

Step 912 for detecting any attached micronuclei in the third segmented image can be carried out by comparing the third segmented image and the first segmented image. In some implementations, an image comprising only the attached micronuclei may be obtained by subtracting the first segmented image from the third segmented image. In some implementations, indentations can be located on nuclei clusters in the third segmented image in the same way as described in step 806 and 808 of FIG. 8 with respect to the first segmented image. Indentations can be located around attached micronuclei in a nuclei cluster. These indentations can be used to reject artifacts resulted from the image subtraction, i.e., only those parts of the result image from the subtraction that has associated indentations are identified as attached micronuclei, other parts of the result image are eliminated as artifacts.

Step 914 for assigning each attached and unattached micronuclei to a cell is carried out in two stages: assigning each attached micronucleus to a cell containing a nucleus to which the micronucleus is attached, and assigning each unattached micronucleus to a cell containing a nucleus that is in the closest proximity to the unattached micronucleus. In some implementations, a distance between each unattached micronucleus and an adjacent nucleus is determined for cell assignment and the unattached micronucleus is assigned to a cell containing the adjacent nucleus if the distance is within the acceptable distance range specified by the user in the one or more micronuclei parameters. In some implementations, the minimum distance between a micronucleus and a main nucleus in a cell specified by a user is used to eliminate an attached micronuclei (or a "bled") that has been initially identified as a micronucleus. In some implementation, the maximum distance between a micronucleus and a main nucleus in a cell specified by a user is used to eliminate a floating DNA fragment that has been mistakenly identified as a micronucleus.

After the cell assignment step 914, step 916 can be performed to calculate a micronuclei count for each cell by tallying the attached and unattached micronuclei assigned to the cell. Step 918 for presenting a result based on the micronuclei count for at least one cell can further include presenting a count for cells that include at least one micronucleus, presenting a ratio between the number of mono-nucleated cells and the number of micronucleated cells in the cell-containing sample, and/or presenting a ratio between the number of micronuclei and the number of cells in the cell-containing sample. In some implementations, where cells are further classified as mono-nucleated, bi-nucleated, multi-nucleated, probe A positive, probe B positive, probe AB positive, and so on, a count for micronucleated cells within each of these categories can be presented.

In some implementations, where a user has specified a non-zero minimum distance between a micronucleus and a main nucleus, the processing steps specific to attached micronuclei segmentation, counting and assignment can be optionally skipped. Alternatively, only the non-zero minimum distance only affects the presentation of the results, and can be toggled on and off for easy result comparison.

Figure 10:
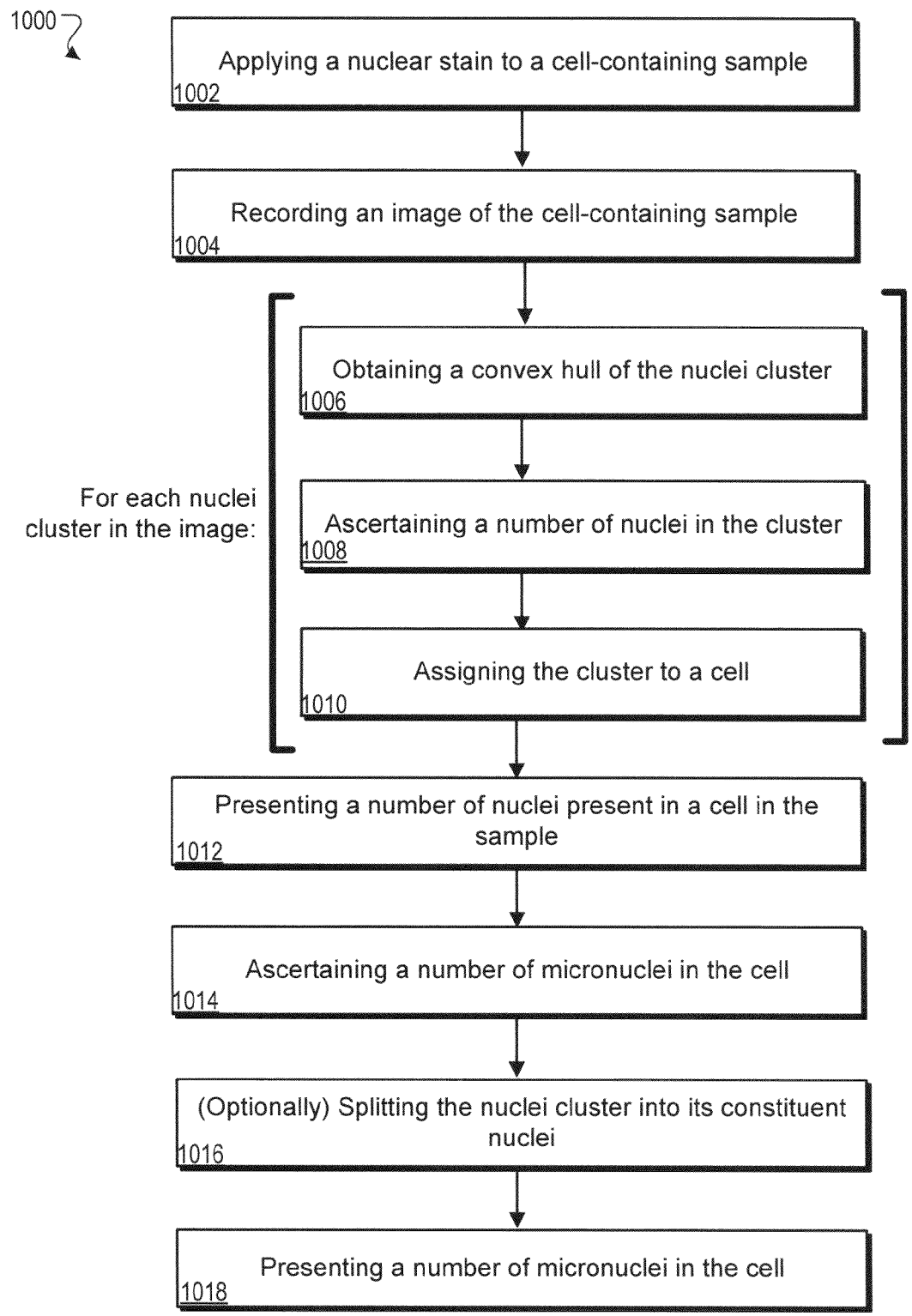
FIG. 10 shows a flow diagram of an exemplary process for utilizing the convex hull method for nuclei counting based on a nuclear image of the cell-containing sample.

FIG. 10 shows an exemplary process 1000 for utilizing the disclosed methods for counting nuclei in a cell-containing sample in a laboratory setting. For example, the process 1000 can include a step 1002 for applying a nuclear stain to a cell-containing sample, a step 1104 for recording an image of the cell-containing sample after the staining step 1002; then for each nuclei cluster in the image, the process 1000 further includes a step 1006 for obtaining a convex hull of the nuclei cluster, a step 1008 for ascertaining a number of nuclei in the nuclei cluster, and a step 1010 for assigning the nuclei cluster to a cell; optionally, the process 1000 can include a step 1012 for presenting a number of nuclei present in a cell in the cell-containing sample; optionally, the process 1000 can also include a step 1014 for ascertaining a number of micronuclei in the cell, and a step 1018 for presenting a number of micronuclei in the cell; optionally, the process 1000 can further include splitting the nuclei cluster into its constituent nuclei and presenting the nuclei resulted from the splitting.

In some implementations, the image is recorded by a fluorescent imaging apparatus. In some implementations, the cell-containing sample is located in a well of a multi-well plate. In some implementations, the cell-containing sample is treated by a chemical that has a clastogenic effect. In some implementations, the image is obtained using a single channel of the fluorescent imaging apparatus. In some implementations, the cell-containing sample is not stained with a cytoplasm marker.

Systems Implementing the Nuclei Counting Methods

The methods disclosed herein for identifying, grouping, and counting main nuclei and micronuclei in a nuclear image of a cell sample can be implemented as a software component or module in an image processing system. The software system can be used in conjunction with a cellular imaging hardware system.

Figure 11:
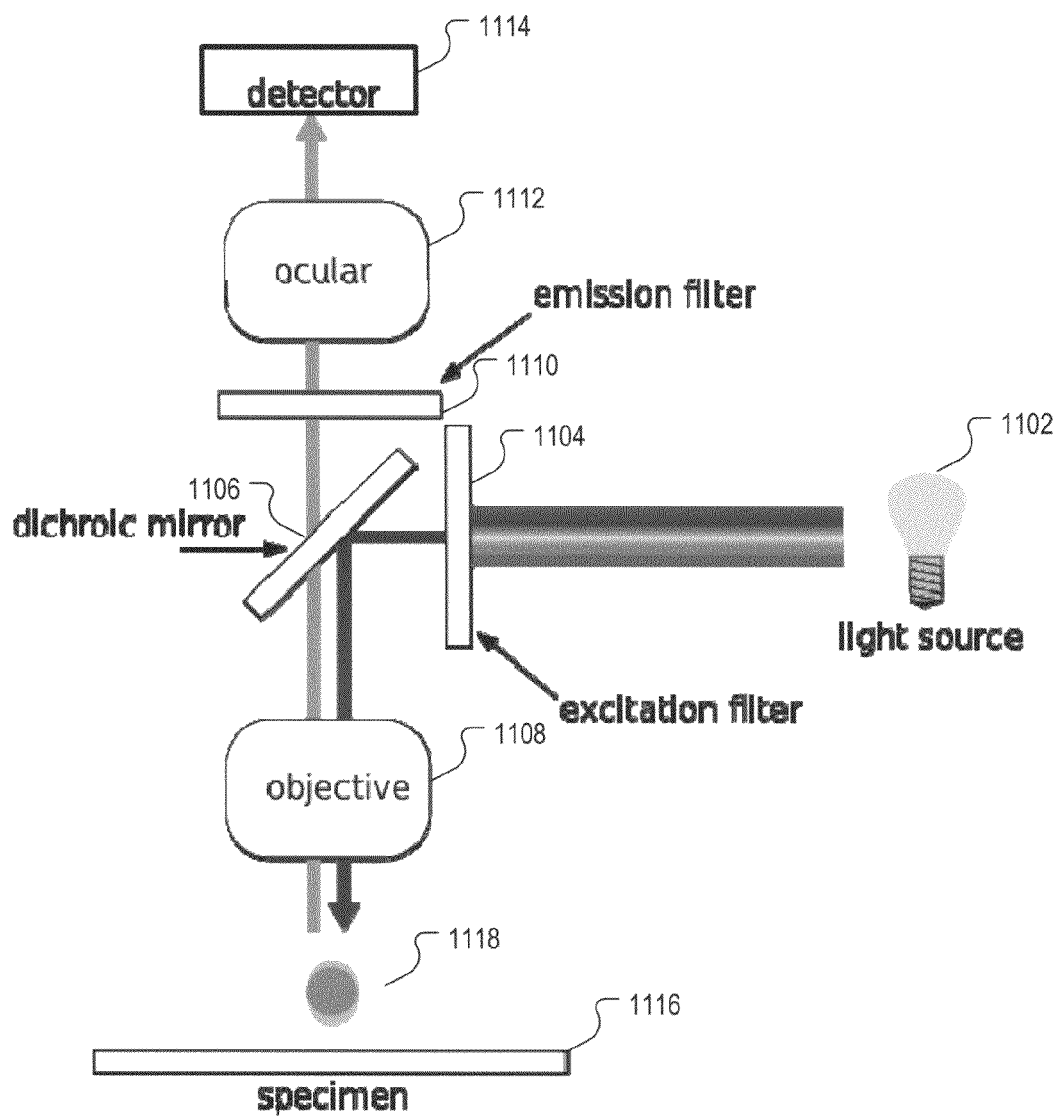
FIG. 11 shows a schematic of an exemplary fluorescent imaging system suitable for performing methods as described herein.

FIG. 11 is a schematic diagram of an exemplary fluorescent imaging system. The system comprises: a light source 1102, an excitation filter 1104, a dichroic mirror 1106, an objective lens 1108, an emission filter 1110, an ocular lens 1112, a detector 1114, and a platform 1116. A cell sample 1118 to be imaged can be placed in a well of a multi-well plate on the platform. During operation, the excitatory light from the light source 1102 irradiates the excitation filter 1104 such that a desired frequency component passes through the excitation filter 1104. A suitable excitation filter can be selected based on the fluorescent marker attached to the specimen. The excitatory light that passes through the excitation filter is deflected by the dichroic mirror 1106 and is focused onto the specimen 1118 by the objective lens 1108. When the specimen 1118 placed on the platform 1116 is exposed to the excitatory light, the fluorescent marker in the specimen gives rise to emitted light which is focused to the detector 1114 by the same objective lens 1118 that is used for the excitation. The emission filter 1110 between the objective lens 1108 and the detector 1114 filters out any excitation light from the fluorescent light emitted by the fluorescent marker in the specimen. The detector 1114 can be a charge-coupled device (CCD) camera that is coupled to a computer. Other devices capable of receiving light and creating a digital image are also suitable for use. The computer can record and/or process the images of the specimen under the excitation as they are captured. Different fluorescent markers can be applied to the specimen that attach to different objects in the specimen (e.g, nuclear materials, cytoplasm, cell membrane, proteins, and so on), and images of each of these markers can be obtained under different combinations of excitatory filters and emission filters (each combination is a fluorescent channel) and processed by the software system.

The software system can be coupled to the imaging system, or operate as a standalone system. The software system can include other capabilities such as classifying nuclear structures as normal, micro, mitotic, apoptotic, necrotic, probe A/B and AB positive, etc. Measurements can be made for individual cells/objects or for the entire image. Mitotic cells can be determined based on the intensity of the nuclei image. Other optional cell markers can be used to identify apoptotic cells and necrotic cells. Mitotic, apoptotic and necrotic cells can be excluded from nuclei splitting and micronuclei statistics. The processing can be performed automatically for images obtained from a multiple-well plate (e.g., a 96-well plate). In some implementations, segmentations results can be available for user preview and manipulation.

Figure 12:
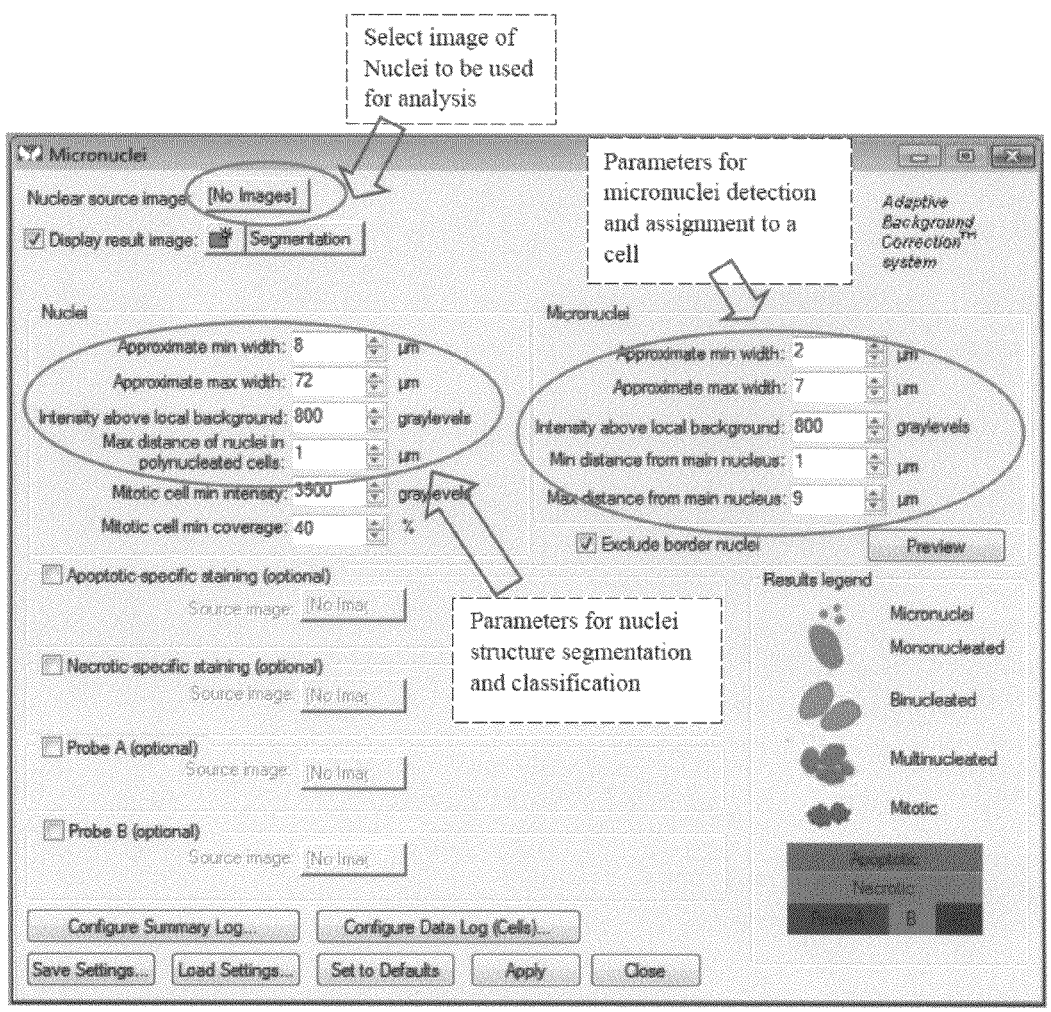
FIG. 12 shows an exemplary user interface of a software program for entering nuclei and micronuclei parameters for nuclei and micronuclei counting using methods as described elsewhere herein.

FIG. 12 shows an exemplary user interface for inputting parameters needed for nuclei image segmentation and cell assignment for main nuclei and micronuclei, respectively. A user can select a raw nuclear image to be processed from this user interface. In this user interface, a user can also optionally specify other source images for identifications of apoptotic, necrotic, probe A, and probe B cells.

For main nuclei segmentation and cell assignment, parameters to be input by a user can include: approximate minimum width, approximate maximum width, intensity above local background, mitotic cell average intensity, and grouping distance. Approximate maximum and approximate minimum widths define the maximum and minimum widths of main nuclei that are expected to be found in the image. Intensity above local background specifies the local contrast intensity threshold of main nuclei compared to the neighboring background levels. This parameter is used in preprocessing to correct uneven image backgrounds throughout the image by adapting to local contrast. This allows more robust segmentation. Grouping distance is also the maximum distance of nuclei in poly-nucleated cells. It specifies the maximum edge-to-edge distance between nuclear structures that will be considered part of a cell. Any nuclear structures that are closer together than the value specified are grouped and are considered to be part of one cell.

For micronuclei segmentation and cell assignment, parameters to be input by a user can include: approximate minimum width, approximate maximum width, intensity above local background, minimum distance from main nucleus, and maximum distance from main nucleus. Approximate maximum width and approximate minimum width define maximum and minimum widths of the micronuclei that are expected to be found in the image. Intensity above local background specifies the local contrast intensity threshold of micronuclei compared to the neighboring background levels. Minimum distance from main nucleus is the minimum distance that a micronucleus can be located from the cell's nucleus or nuclei. Any micronucleus structures that are closer to their main nuclei than this distance are excluded from the analysis. This setting can help distinguish true micronuclei from blebs. Maximum distance from main nucleus is the maximum distance that a micronucleus can be located from the cell's nucleus or nuclei. Any nuclear structures that are farther away from their main nuclei than this distance are excluded from analysis. This setting helps reduce false positive identification of micronuclei. For example, without this setting, DNA fragments from dead cells or dirt could be mistakenly identified as micronuclei.

Figure 13:
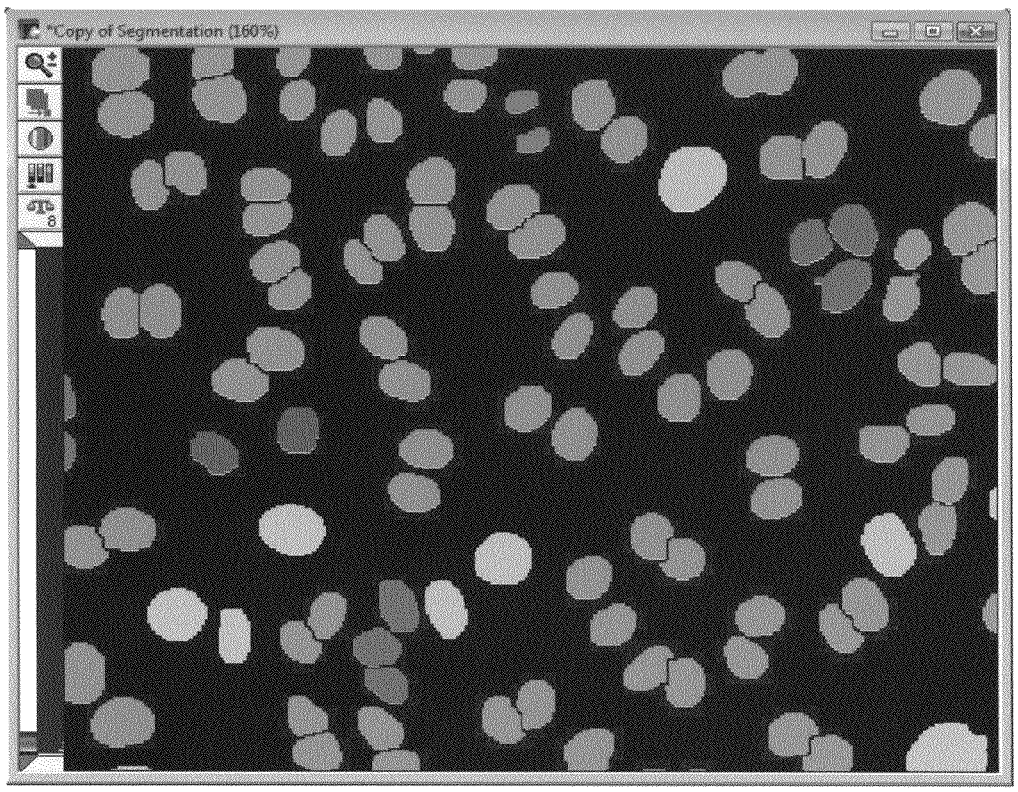
FIG. 13 shows an exemplary output image from a software program configured for nuclei and micronuclei counting using methods as described elsewhere herein.

FIG. 13 is an exemplary output graphic of the software component implementing the method disclosed in the application. In this example, the nuclei are marked by colors corresponding to the category of their respective cells. For example, mono-nucleus (gray), bi-nuclei (orange), multi-nuclei (green), micronuclei (purple), mitotic (red), and so on. Nuclei of each category can be selectively masked or overlaid in the output image. The nuclei splitting results can be shown in this image. However, when nuclei splitting result is not required, the nuclei can be presented as complete clusters without inner boundaries between constituent nuclei being presented.

Figure 14:
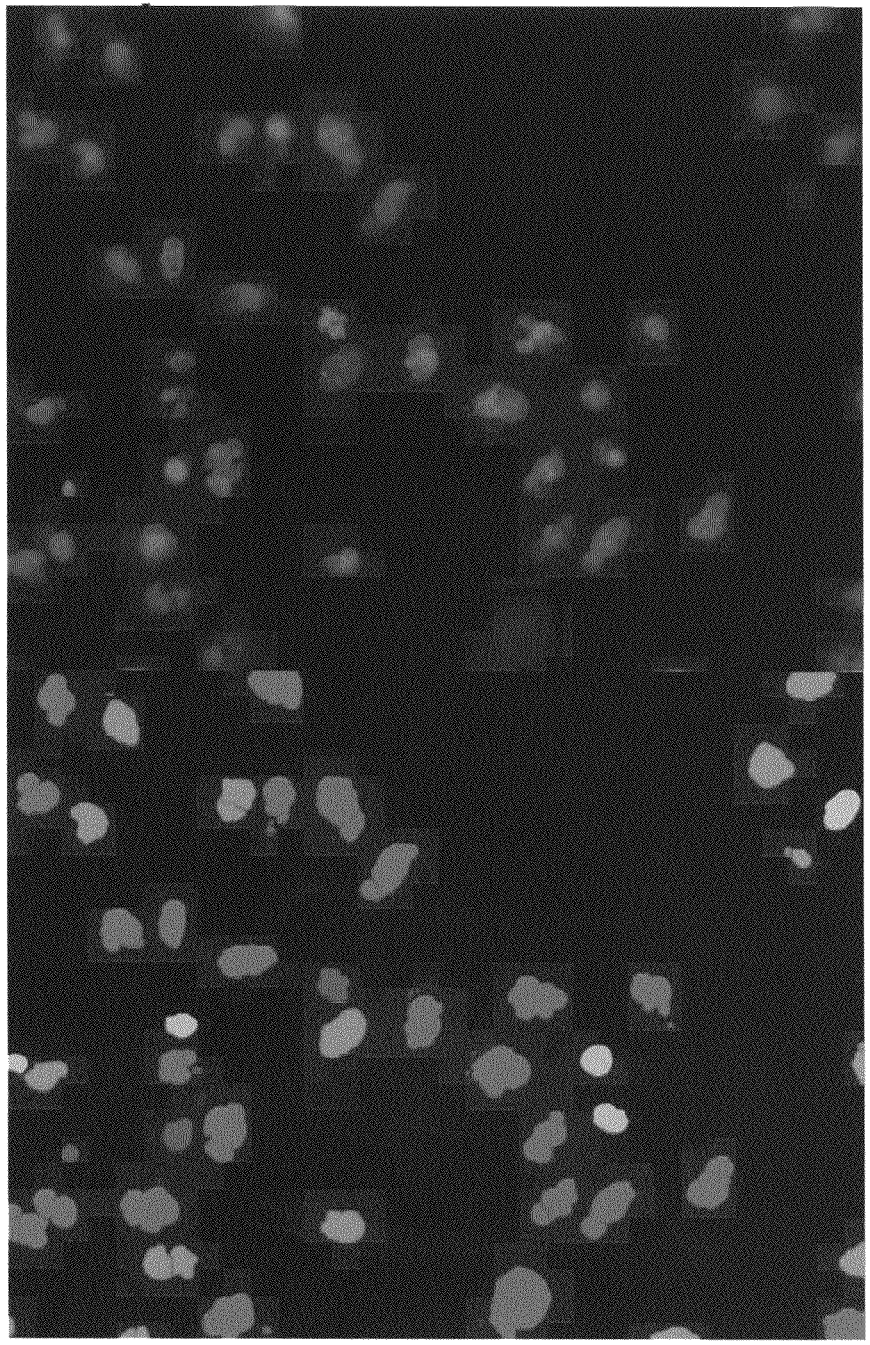
FIGS. 14-15 are exemplary images for nuclei and micronuclei counting using methods as described elsewhere herein.
Figure 15:
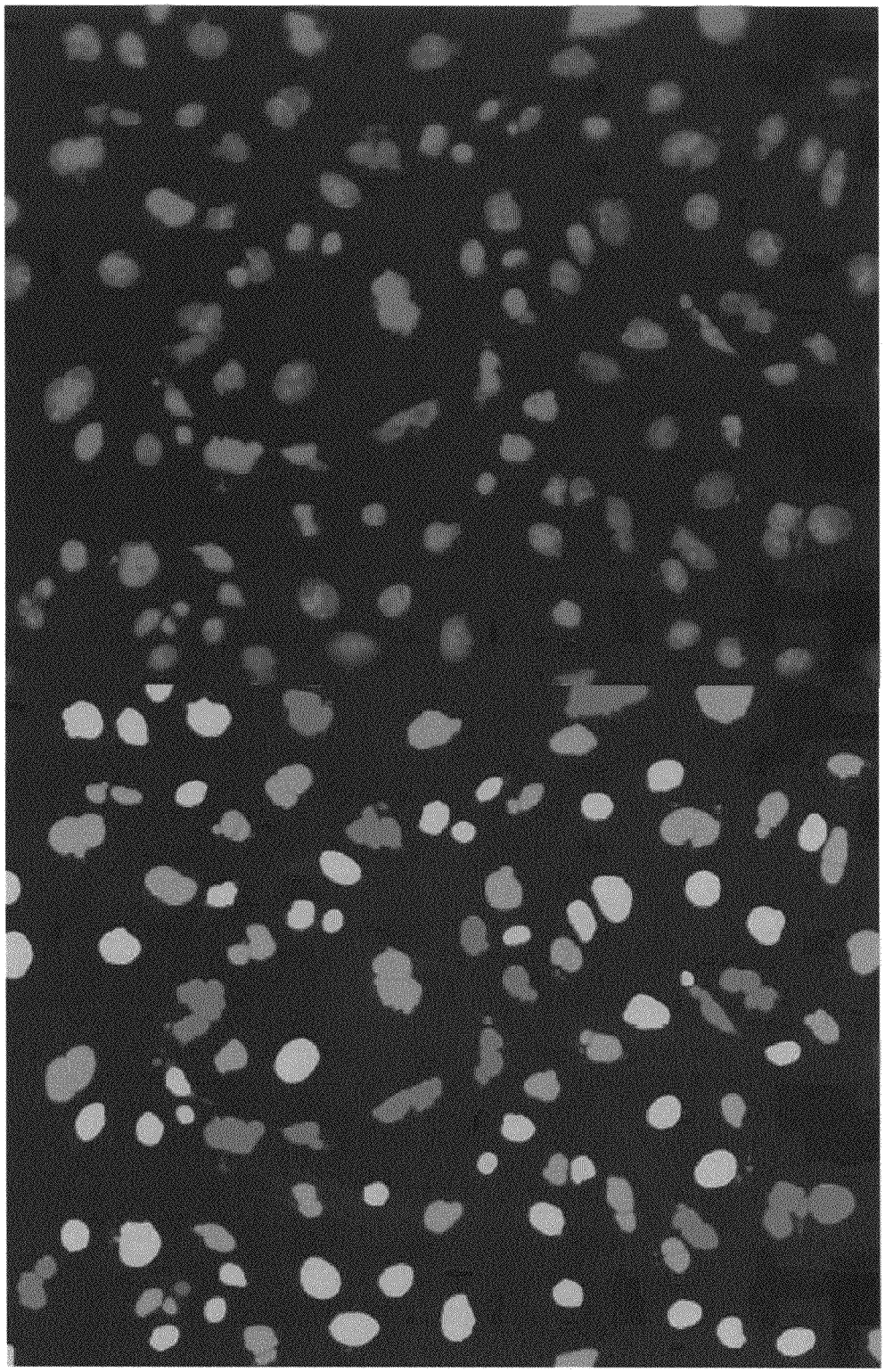

FIGS. 14 and 15 are exemplary results for two sample nuclear images. The top halves of the figures show nuclear images of two cell samples, and the bottom halves of the figures show their respective cells maps comprising nuclei within cells that are classified into mono-, bi-, multi-, micro-, and apoptotic categories.

Figure 16:
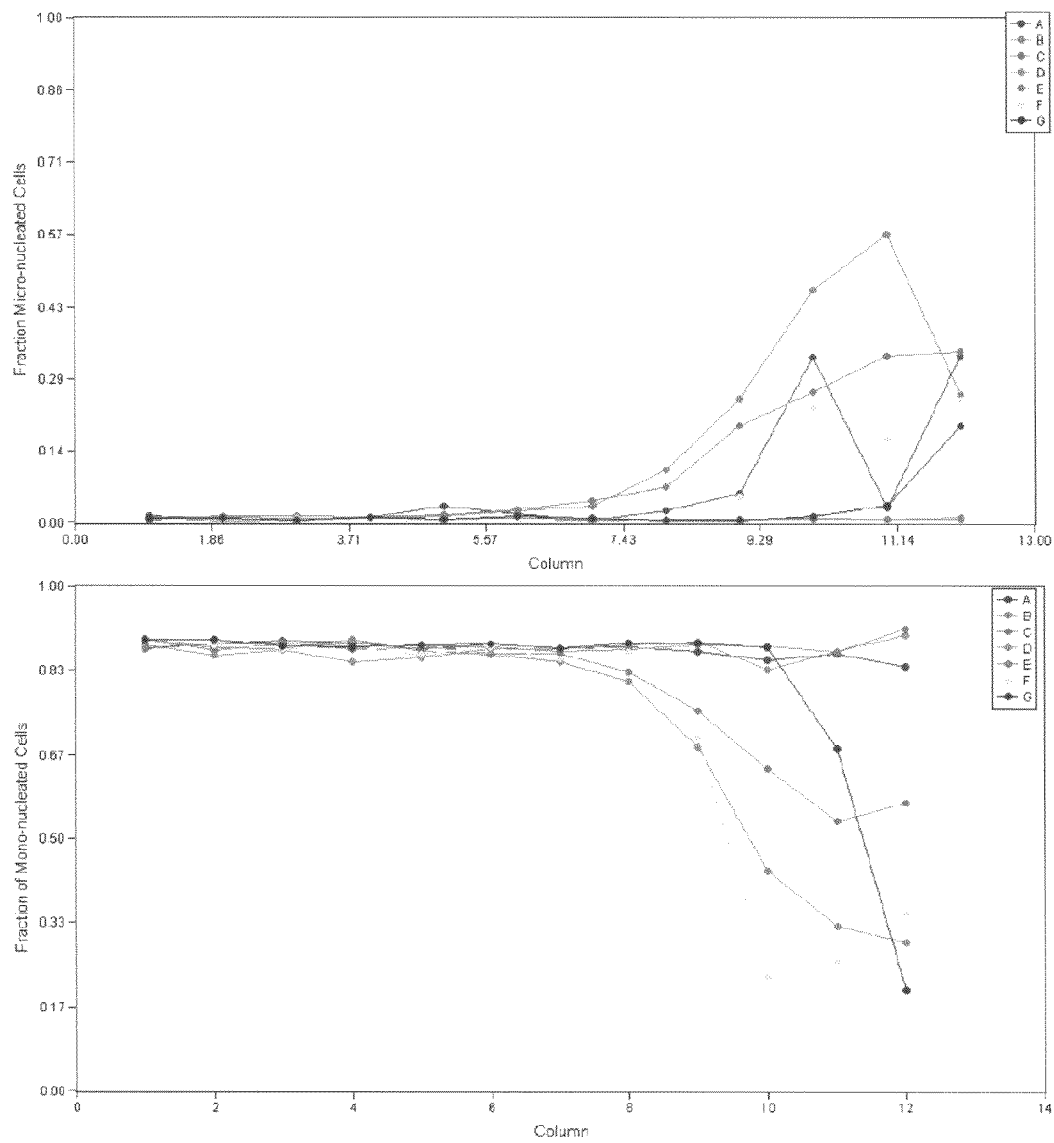
FIG. 16 shows another exemplary output from a software program configured for nuclei and micronuclei counting using methods as described elsewhere herein.

FIG. 16 shows graphs of fraction of micro-nucleated cells (top) and mono-nucleated cells (bottom) for cell samples treated with various drugs. As the drug concentration increases (from left to right on the horizontal axis), the fraction of cells displaying micronuclei increases to over 50% and the number of mono-nucleated cells decreases from 90% to 20% for compound B, C, F, G drugs, while control compounds A, D, and E show minimum change.

Exemplary Data Storage Media and Computer System

Figure 17:
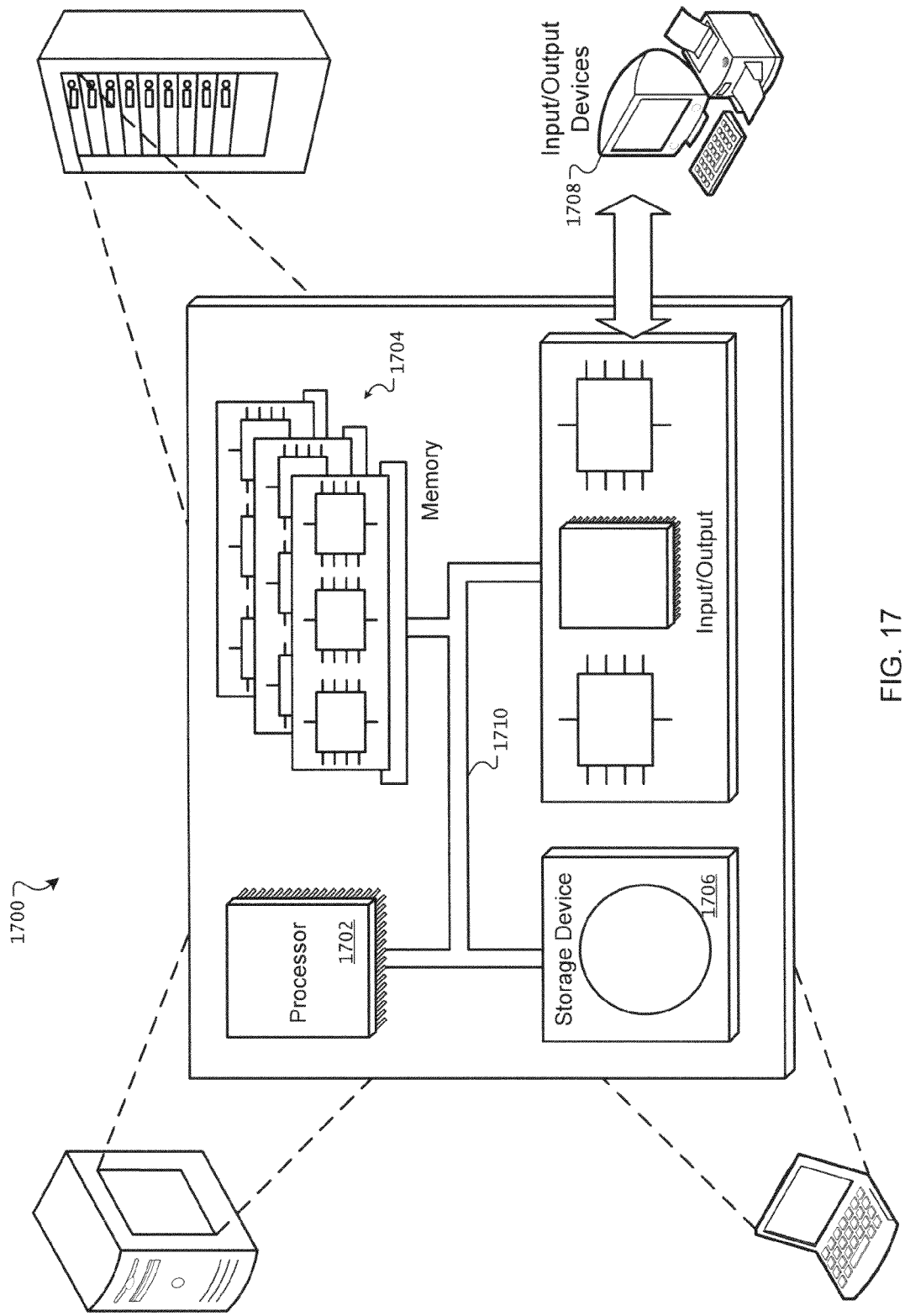
FIG. 17 shows a schematic for a computer system that can be used to implement and carry out methods as described elsewhere herein.

FIG. 17 is a schematic diagram of a generic computer system 1700. The system 1700 can be used for practicing operations described in association with the methods described herein. The system 1700 can include a processor 1702, a memory 1704, a storage device 1706, and input/output devices 1708. Each of the components 1702, 1704, 1706, and 1708 are interconnected using a system bus 1710. The processor 1702 is capable of processing instructions for execution within the system 1700. Such executed instructions can implement one or more components of system 200, for example. In one implementation, the processor 1702 is a single-threaded processor. In another implementation, the processor 1702 is a multi-threaded processor. The processor 1702 is capable of processing instructions stored in the memory 1704 or on the storage device 1706 to display information for a user interface on the input/output device 1708.

The memory 1704 is a computer readable medium such as volatile or non-volatile memory that stores information within the system 1700. The memory 1704 could store data structures representing images, nuclei cluster, nuclei and micronuclei parameters, and so on, for example. The storage device 1706 is capable of providing persistent storage for the system 1700. The storage device 1706 may be a floppy disk device, a hard disk device, an optical disk device, or a tape device, or other suitable persistent storage means. The input/output device 1708 provides input/output operations for the system 1700. In one implementation, the input/output device 1708 includes a keyboard and/or pointing device. In another implementation, the input/output device 1708 includes a display unit for displaying graphical user interfaces.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computer environment. Exemplary languages include, but are not limited to, FORTRAN, C, C++, Java, and Perl. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. Processors suitable for the execution of a computer program on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor or LCD (liquid crystal display), or OLED (organic light emitting diode, or organic electroluminescent display) panel, for displaying information to a user and a keyboard and a pointing device, e.g., a mouse, trackpad, light-pen, or trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communications networks include a local area network (LAN) and a wide area network (WAN), e.g., the Internet.

The computing system can include clients and servers. A client and server are generally remote from each other and typically interact through a communication network. The relationship of client and server arises by virtual of computer programs running on the respective computers and having a client server relationship to each other.

While the instant specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombinations. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be preformed in the particular order shown or in sequential order, or that all illustrated operations be performed, to achieve desirable results. In certain circumstances, multitasking and parallel processing may be advantageous. Moreover, the separation of various system components in the embodiments described herein should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Throughout the description and claims of the specification the word "comprise" and variations thereof, such as "comprising" and "comprises", is not intended to exclude other additives, components, integers or steps.

Unless otherwise defined, all technical and scientific terms used herein have the same meaning as commonly understood by one of ordinary skill in the art to which this technology belongs. Although methods and materials similar or equivalent to those described herein can be used in the practice or testing of the present technology, suitable methods and materials are described below. All publications, patent applications, patents, and other references mentioned herein are incorporated by reference in their entirety. In case of conflict, the present specification, including definitions, will control. In addition, the materials, methods, and examples described herein are illustrative only and are not intended to be limiting. Other features and advantages of the technology described herein will be apparent from the detailed description, and from the claims.

What is claimed:

1. A computer-implemented method for counting nuclei of a plurality of cells in a cell-containing sample, the method comprising:

receiving a raw image of the cell-containing sample; transforming the raw image into a segmented image comprising one or more nuclei clusters on a contrasting background; for each of the one or more nuclei clusters: obtaining a convex hull of the nuclei cluster; locating any indentations on the nuclei cluster by comparing the nuclei cluster to the convex hull of the nuclei cluster; calculating a first nuclei count for the nuclei cluster based on a tally of the indentations; and assigning the nuclei cluster to a cell among the plurality of cells; calculating a second nuclei count for each cell of the plurality of cells by totaling the first nuclei counts of its constituent nuclei clusters; and generating a result based on the second nuclei count for at least one of the plurality of cells.

2. The method of claim 1, wherein the generating the result further comprises: categorizing each of the plurality of cells as mono-nucleated, bi-nucleated, or multi-nucleated based on its second nuclei count; and presenting a tally of cells in at least one category.

3. The method of claim 1, wherein: the raw image of the cell-containing sample is a fluorescent image of stained nuclei of the cells in the cell-containing sample.

4. The method of claim 1, wherein: the raw image is a monochromatic image that is obtained from a single fluorescent imaging channel.

5. The method of claim 1, further comprising: receiving one or more nuclei parameters specifying an estimated size and a minimum intensity of nuclei in the raw image; and wherein transforming the raw image into the segmented image comprising one or more nuclei clusters further comprises isolating nuclei clusters from the raw image based on the one or more nuclei parameters.

6. The method of claim 5, wherein the segmented image is a binary image.

7. The method of claim 1, wherein: locating any indentations on the nuclei cluster further comprises: obtaining a filter image comprising the convex hull of the nuclei cluster; and subtracting the nuclei cluster in the segmented image from its respective convex hull in the filter image.

8. The method of claim 1, further comprising: receiving a parameter specifying a maximum distance between two nuclei that belong in a single cell; and wherein: assigning the nuclei cluster to a cell further comprises: if the first nuclei counts of the nuclei cluster and a second nuclei cluster are both equal to one, determining a separation distance between the nuclei cluster and the second nuclei cluster; and assigning the nuclei cluster and the second nuclei cluster to a common cell if the separation distance is less than the maximum distance.

9. The method of claim 8, further comprising: receiving a second raw image comprising stained cytoplasm of the cells in the cell-containing sample; verifying cell assignment of the nuclei cluster and the second nuclei cluster by detecting an intensity gap between locations of the nuclei cluster and the second nuclei cluster in the second raw image.

10. The method of claim 1, further comprising: for each nuclei cluster having one or more indentations: enhancing a size of each of the one or more indentations in the segmented image; and splitting the nuclei cluster, at the indentations, into two or more nuclei.

11. The method of claim 10, wherein the generating the result further comprises: assigning each of the plurality of cells into a category according to its second nuclei count; and presenting a cell map comprising cells from one or more of the categories, wherein cells from each category are identified by a common feature, and at least one of the cells comprises nuclei that resulted from the splitting.

12. The method of claim 10, wherein splitting the nuclei cluster into two or more nuclei further comprises: obtaining a distance transform based on the nuclei cluster in the segmented image with enhanced indentations; and obtaining boundaries between two or more nuclei in the nuclei cluster by applying a watershed transform on the distance transform.

13. The method of claim 1, further comprising: receiving one or more micronuclei parameters specifying an estimated size, a minimum intensity, and a distance range from a main nucleus for micronuclei in the raw image; transforming the raw image into a second segmented image comprising one or more unattached micronuclei based on the one or more micronuclei parameters; transforming the raw image into a third segmented image comprising one or more nuclei clusters based on the one or more micronuclei parameters such that the third segmented image has sufficient resolution to include attached micronuclei in the one or more nuclei clusters; detecting any attached micronuclei in the one or more nuclei clusters in the third segmented image; assigning each of the unattached and the attached micronuclei to a cell among the plurality of cells; and calculating a micronuclei count for each of the plurality of cells by tallying the unattached and the attached micronuclei that are assigned to the cell.

14. The method of claim 13, wherein detecting any attached micronuclei comprises: subtracting each nuclei cluster the third segmented image from its corresponding nuclei cluster in the first segmented image; and identifying attached micronuclei from an image that resulted from the subtraction.

15. The method of claim 13, wherein generating the result further comprises: presenting a result based on the second nuclei count and the micronuclei count of at least one of the plurality of cells.

16. The method of claim 13, wherein assigning each of the unattached and attached micronuclei to a cell among the plurality of cells further comprises: assigning each attached micronucleus to a cell containing a nucleus to which the micronuclei is attached; for each unattached micronucleus: calculating a distance between the unattached micronucleus and an adjacent nuclei cluster; and assigning the unattached micronuclei to a cell containing the nuclei cluster if the distance is within the distance range specified by the one or more micronuclei parameters.

17. A computer-readable medium having instructions stored thereon, which, when executed by at least one processor, cause the processor to perform operations comprising: receiving a raw image of the cell-containing sample; transforming the raw image into a segmented image comprising one or more nuclei clusters on a contrasting background; for each of the one or more nuclei clusters: obtaining a convex hull of the nuclei cluster; locating any indentations on the nuclei cluster by comparing the nuclei cluster to the convex hull of the nuclei cluster; calculating a first nuclei count based on a tally of the indentations; and assigning the nuclei cluster to a cell among the plurality of cells; calculating a second nuclei count for each cell of the plurality of cells by totaling the first nuclei counts of its constituent nuclei clusters; and generating a result based on the second nuclei count for at least one of the plurality of cells.

18. A system comprising:
one or more processors; memory coupled to the one or more processors and operable for storing instructions, which, when executed by the one or more processors, causes the one or more processors to perform operations, comprising: receiving a raw image of the cell-containing sample; transforming the raw image into a segmented image comprising one or more nuclei clusters on a contrasting background; for each of the one or more nuclei clusters: obtaining a convex hull of the nuclei cluster; locating any indentations on the nuclei cluster by comparing the nuclei cluster to the convex hull of the nuclei cluster; calculating a first nuclei count based on a tally of the indentations; and assigning the nuclei cluster to a cell among the plurality of cells; calculating a second nuclei count for each cell of the plurality of cells by totaling the first nuclei counts of its constituent nuclei clusters; and presenting to a user a result based on the second nuclei count for at least one of the plurality of cells.

19. A method of counting cell nuclei in a cell-containing sample, the method comprising:
applying a nuclear stain to the cell-containing sample; recording an image of the cell-containing sample, after applying the stain; obtaining a convex hull of one or more clusters of nuclei in the image; for each of the one or more clusters for which a convex hull is obtained: ascertaining a number of nuclei in the cluster; and assigning the cluster to a cell; and providing a number of nuclei present in a cell in the sample.

20. The method of claim 19, wherein the image is recorded by a fluorescent imaging apparatus.

21. The method of claim 19, wherein the cell-containing sample is located in a well of a multi-well plate.

* * * * *